(12) United States Patent
Yi et al.

(10) Patent No.: US 9,830,692 B2
(45) Date of Patent: Nov. 28, 2017

(54) METHOD AND DEVICE FOR PROCESSING IMAGE DATA BASED ON CHARACTERISTIC VALUES OF PIXEL VALUES OF PIXELS

(71) Applicant: SAMSUNG ELECTRONICS CO., LTD., Suwon-si (KR)

(72) Inventors: Ji-Young Yi, Suwon-si (KR); Hyun-Hee Park, Seoul (KR); Jong-Ho Kim, Seongnam-si (KR); Kee-hyon Park, Suwon-si (KR); Yong-man Lee, Suwon-si (KR); Jae-Hun Cho, Suwon-si (KR); Dong-kyoon Han, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 14/626,134

(22) Filed: Feb. 19, 2015

(65) Prior Publication Data
US 2015/0235353 A1    Aug. 20, 2015

(30) Foreign Application Priority Data
Feb. 19, 2014    (KR) ........................ 10-2014-0019223

(51) Int. Cl.
*G06T 5/00* (2006.01)
*G06T 5/50* (2006.01)
(Continued)

(52) U.S. Cl.
CPC ............ *G06T 5/009* (2013.01); *G06K 9/4661* (2013.01); *G06T 5/40* (2013.01); *G06T 5/50* (2013.01);
(Continued)

(58) Field of Classification Search
None
See application file for complete search history.

(56) References Cited

U.S. PATENT DOCUMENTS

| | | | | |
|---|---|---|---|---|
| 6,037,976 A | * | 3/2000 | Wixson | G06K 9/00785 348/122 |
| 7,421,121 B2 | * | 9/2008 | Sachs | H04N 1/6077 348/E9.051 |

(Continued)

FOREIGN PATENT DOCUMENTS

| | | |
|---|---|---|
| CN | 101120379 B | 12/2010 |
| CN | 102842116 A * | 12/2012 |

OTHER PUBLICATIONS

Communication issued Sep. 1, 2017 by the State Intellectual Property Office of P.R. China in counterpart Chinese Patent Application No. 201510087885.8.

*Primary Examiner* — Utpal Shah
(74) *Attorney, Agent, or Firm* — Sughrue Mion, PLLC

(57) ABSTRACT

Provided are a method and a device for processing image data. According to the method, first characteristic values respectively of a plurality of regions of a first image are determined by sequentially calculating, for each of the plurality of regions, characteristic values corresponding to each of pixel values of pixels included in each of the plurality of regions while sequentially receiving the pixel values of the pixels; based on the determined first characteristic values, an illumination image related to a second image that is a following image of the first image is obtained; and, based on the obtained illumination image, the second image is modified.

18 Claims, 16 Drawing Sheets

(51) Int. Cl.
   *G06K 9/46* (2006.01)
   *G06T 5/40* (2006.01)
(52) U.S. Cl.
   CPC ............... *G06T 2207/20208* (2013.01); *G06T 2207/20216* (2013.01)

(56) References Cited

U.S. PATENT DOCUMENTS

| | | | | |
|---|---|---|---|---|
| 7,433,540 B1* | 10/2008 | Schuster | ................ | G06K 9/32 345/629 |
| 7,760,943 B2 | 7/2010 | Shaked | | |
| 8,045,765 B2 | 10/2011 | Baba et al. | | |
| 8,842,118 B1* | 9/2014 | White | ................ | G06T 7/0024 345/426 |
| 9,158,973 B1* | 10/2015 | Garg | ................ | G06K 9/00744 |
| 2005/0074163 A1* | 4/2005 | Shaked | ................ | H04N 1/6086 382/162 |
| 2007/0071350 A1* | 3/2007 | Lee | ................ | G06T 5/008 382/260 |
| 2007/0165945 A1* | 7/2007 | Goma | ................ | H04N 1/6077 382/167 |
| 2007/0268363 A1* | 11/2007 | Raskar | ................ | G01J 1/42 348/135 |
| 2007/0268366 A1* | 11/2007 | Raskar | ................ | G01J 1/42 348/143 |
| 2007/0268398 A1* | 11/2007 | Raskar | ................ | G01S 17/023 348/370 |
| 2007/0268481 A1* | 11/2007 | Raskar | ................ | G01J 1/42 356/218 |
| 2008/0107333 A1* | 5/2008 | Mazinani | ................ | G06T 5/20 382/167 |
| 2008/0112641 A1* | 5/2008 | Oakley | ................ | H04N 5/361 382/274 |
| 2008/0260282 A1* | 10/2008 | Hasegawa | ................ | G06T 5/009 382/260 |
| 2008/0298723 A1* | 12/2008 | Hasegawa | ................ | G06T 1/60 382/305 |
| 2009/0041376 A1* | 2/2009 | Carletta | ................ | G06T 5/50 382/274 |
| 2010/0303372 A1* | 12/2010 | Zhao | ................ | H04N 1/409 382/254 |
| 2011/0096366 A1* | 4/2011 | Oka | ................ | G06T 5/002 358/3.26 |
| 2012/0236184 A1* | 9/2012 | Jia | ................ | G06T 5/005 348/241 |
| 2012/0301050 A1* | 11/2012 | Wakazono | ................ | H04N 5/23229 382/274 |
| 2012/0314970 A1* | 12/2012 | Kim | ................ | G06T 5/008 382/264 |
| 2012/0321180 A1* | 12/2012 | Friedhoff | ................ | G06K 9/4661 382/165 |
| 2012/0321222 A1* | 12/2012 | Smith | ................ | G06K 9/00677 382/305 |
| 2014/0269943 A1* | 9/2014 | Richardson | ................ | H04N 19/80 375/240.29 |
| 2015/0125074 A1* | 5/2015 | Yu | ................ | G06T 7/408 382/164 |
| 2015/0279113 A1* | 10/2015 | Knorr | ................ | G06T 19/006 345/633 |

* cited by examiner

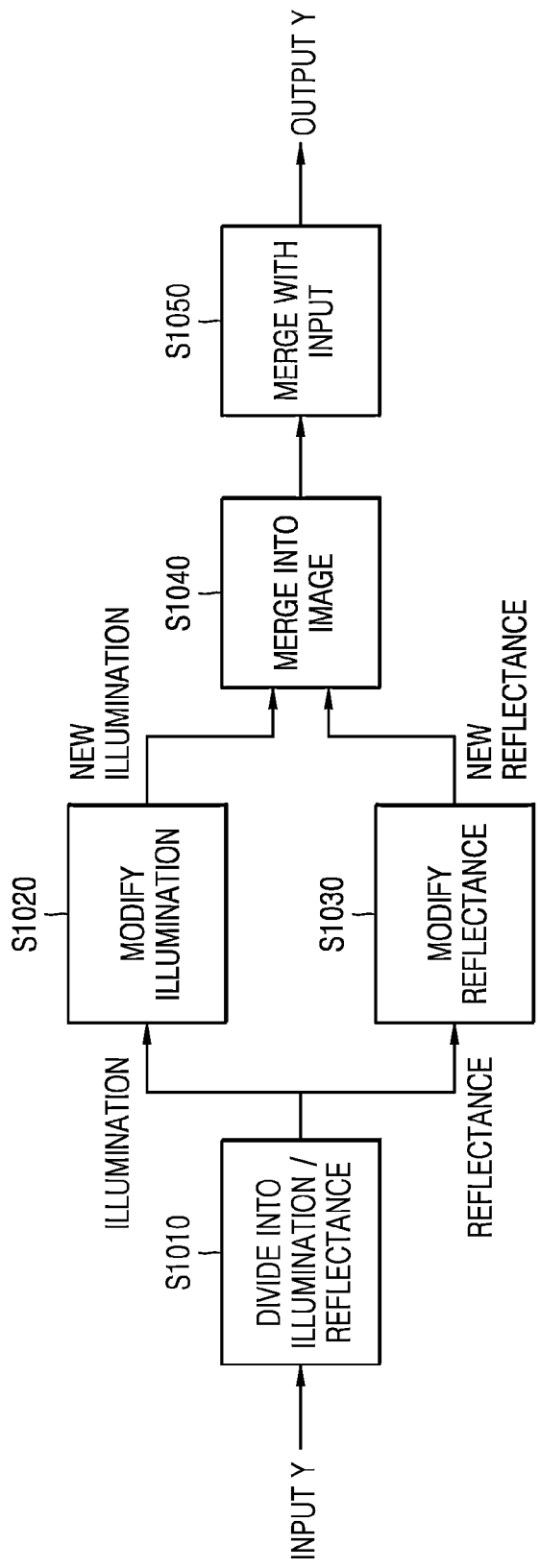

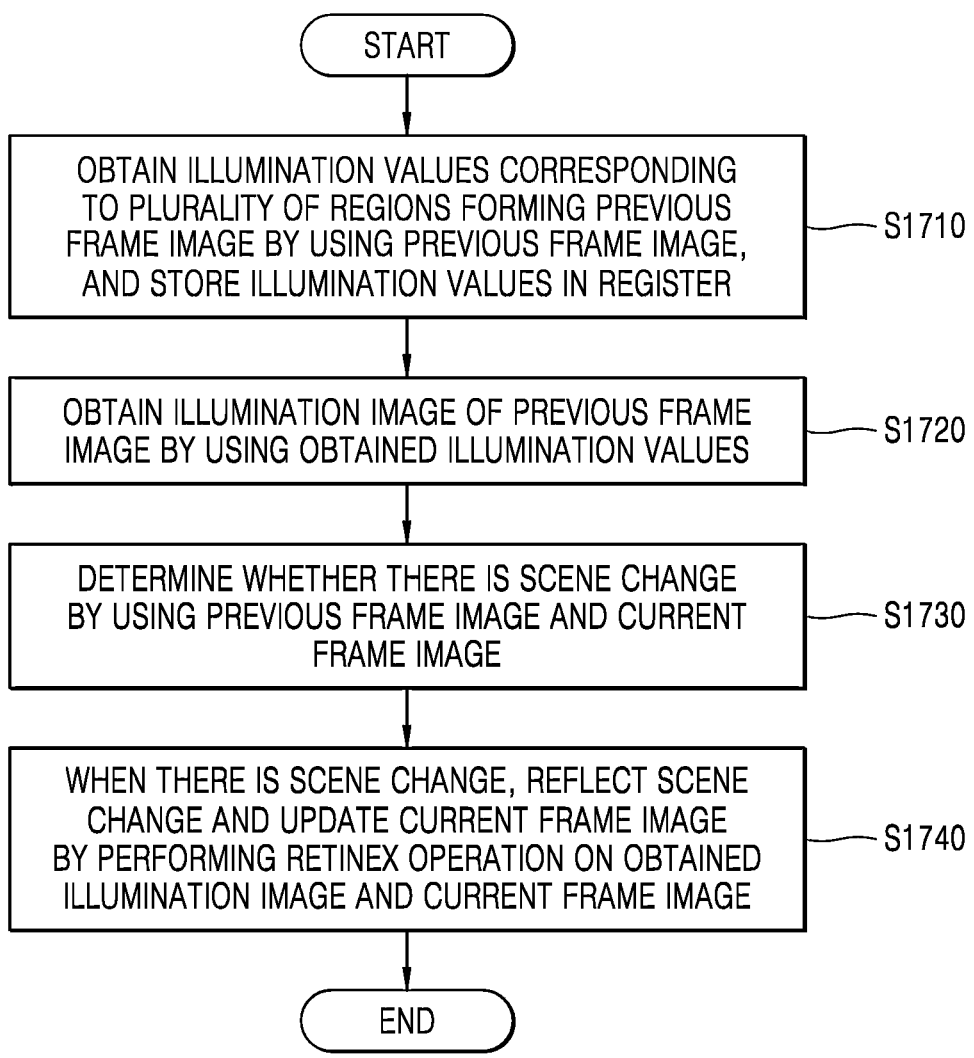

METHOD AND DEVICE FOR PROCESSING IMAGE DATA BASED ON CHARACTERISTIC VALUES OF PIXEL VALUES OF PIXELS

CROSS-REFERENCE TO RELATED APPLICATION

This application claims priority from Korean Patent Application No. 10-2014-0019223, filed on Feb. 19, 2014 in the Korean Intellectual Property Office, the disclosure of which is incorporated herein in its entirety by reference.

BACKGROUND

1. Field

Apparatuses and methods consistent with exemplary embodiments relate to processing image data.

2. Description of the Related Art

According to developments in information and communication technology, image data processing technology is continuously improving. In general image data processing, pixel values of pixels are stored and processed in a memory while image data is processed.

Also, generally, when image data is input, the image data is sequentially input starting from the first pixel.

Accordingly, a related art technology processes image data by storing and processing the image data that is sequentially input from the first pixel in a memory.

SUMMARY

Aspects of one or more exemplary embodiments include a method of efficiently processing image data.

Aspects of one or more exemplary embodiments include a method of obtaining, by a device, a desired output value by performing an operation on input image data.

Additional aspects will be set forth in part in the description which follows and, in part, will be apparent from the description, or may be learned by practice of exemplary embodiments.

According to an aspect of an exemplary embodiment, there is provided a method of processing image data, the method including: determining first characteristic values respectively of a plurality of regions of a first image by sequentially calculating, for each of the plurality of regions, characteristic values corresponding to each of pixel values of pixels included in each of the plurality of regions while sequentially receiving the pixel values of the pixels; obtaining, based on the determined first characteristic values, an illumination image related to a second image that is a following image of the first image; and modifying, based on the obtained illumination image, the second image.

The determining the first characteristic values may further include: obtaining a first pixel value of a first pixel included in a first region from among the plurality of regions of the first image while sequentially receiving pixel values of pixels included in the first region; obtaining a second pixel value of a second pixel included in the first region while sequentially receiving the pixel values of the pixels included in the first region; determining a cumulative characteristic value based on a weighted sum of the first pixel value and the second pixel value; obtaining a third pixel value of a third pixel included in the first region while sequentially receiving the pixel values of the pixels included in the first region; and updating the cumulative characteristic value based on a weighed sum of the cumulative characteristic value and the third pixel value.

The obtaining the illumination image may include obtaining a pixel value of an illumination pixel included in the illumination image based on first characteristic values, among the determined first characteristic values, of a predetermined number of regions, which are most adjacent to the illumination pixel, from among the plurality of regions.

The obtaining the illumination image may further include performing linear interpolation on intervals between the illumination pixel and the predetermined number of regions.

The method may further include: determining second characteristic values respectively of a plurality of regions of a second image by sequentially calculating, for each of the plurality of regions, characteristic values of each of pixel values of pixels included in each of the plurality of regions while sequentially receiving the pixel values of the pixels; and determining third characteristic values respectively of corresponding regions, from among the plurality of regions of the first image and the plurality of regions of the second image, based respectively on the first characteristic values and the second characteristic values of the corresponding regions, wherein the obtaining the illumination image may be performed based on the third characteristic values determined based on the first characteristic values.

The modifying may include: determining reflectance pixel values based on the third characteristic values and the pixel values of the pixels included in each of the plurality of regions of the second image; determining output pixel values based on a weighted sum of the third characteristic values and the reflectance pixel values; and modifying the second image based on the determined output pixel values.

The method may further include storing the determined first characteristic values in a register.

The modifying may include: determining whether at least a predetermined proportion of the pixel values of the pixels included in each of the plurality of regions of the first image are within a predetermined range; and determining whether to modify the second image based on a result of the determining whether the at least the predetermined proportion of the pixel values are within the predetermined range.

The determining whether to modify the second image may include skipping the modifying of the second image in response to determining that the at least the predetermined proportion of the pixel values are within the predetermined range.

The first image may be an image of a previous frame and the second image may be an image of a current frame.

According to an aspect of another exemplary embodiment, there is provided a device for processing image data, the device including: a characteristic value determiner configured to determine first characteristic values respectively of a plurality of regions of a first image by sequentially calculating, for each of the plurality of regions, characteristic values of each of pixel values of pixels included in each of the plurality of regions while sequentially receiving the pixel values of the pixels included; an illumination image obtainer configured to obtain, based on the determined first characteristic values, an illumination image related to the first image; and an image modifier that modifies, based on the obtained illumination image, a second image that is a following image of the first image.

The characteristic value determiner may be configured to: obtain a first pixel value of a first pixel included in a first region from among the plurality of regions of the first image while sequentially receiving pixel values of pixels included in the first region; obtain a second pixel value of a second pixel included in the first region while sequentially receiving the pixel values of the pixels included in the first region; and determine a characteristic value of the first region based on the first pixel value and the second pixel value.

The illumination image obtainer may be configured to obtain a pixel value of an illumination pixel included in the illumination image based on first characteristic values, among the determined first characteristic values, of a predetermined number of regions, which are most adjacent to the illumination pixel, from among the plurality of regions.

The characteristic value determiner may be configured to determine second characteristic values respectively of a plurality of regions of a second image by sequentially calculating, for each of the plurality of regions, characteristic values corresponding to each of pixel values of pixels included in each of the plurality of regions while sequentially receiving the pixel values of the pixels, and to determine third characteristic values respectively of corresponding regions, from among the plurality of regions of the first image and the plurality of regions of the second image, based respectively on the first characteristic values and the second characteristic values of the corresponding regions, and the illumination image obtainer may be configured to obtain the illumination image based on the third characteristic values determined based on the first characteristic values.

The image modifier may be configured to: determine reflectance pixel values based on the third characteristic values and the pixel values of the pixels included in each of the plurality of regions of the second image; determine output pixel values based on a weighted sum of the third characteristic values and the reflectance pixel values; and modify the second image based on the determined output pixel values.

The device may further include a register configured to store the determined first characteristic values.

The image modifier may be configured to: determine whether at least a predetermined proportion of the pixel values of the pixels included in each of the plurality of regions of the first image are within a predetermined range; and determine whether to modify the second image based on a result of the determining whether the at least the predetermined proportion of the pixel values are within the predetermined range.

According to an aspect of another exemplary embodiment, there is provided a method of processing image data, the method including: obtaining illumination values respectively corresponding to each of a plurality of regions of a previous frame image based on the previous frame image, and storing the obtained illumination values in a register; obtaining an illumination image of the previous frame image based on the obtained illumination values; and updating a current frame image by performing a retinex operation on the obtained illumination image and the current frame image.

The method may further include: determining whether a scene change occurs from the previous frame image to the current frame image, based on the previous frame image and the current frame image, wherein the updating the current frame image may be performed by reflecting the scene change in the current frame image in response to determining that the scene change occurs.

According to an aspect of another exemplary embodiment, there is provided a non-transitory computer-readable recording medium having recorded thereon a program, which when executed by a computer, performs the above method.

According to an aspect of another exemplary embodiment, there is provided a device for processing image data, the device including: a characteristic value determiner configured to obtain illumination values respectively corresponding to each of a plurality of regions of a previous frame image based on the previous frame image; an illumination image obtainer configured to obtain an illumination image of the previous frame image based on the obtained illumination values; an image modifier configured to update a current frame image by performing a retinex operation on the obtained illumination image and the current frame image.

The device may further include a register configured to store the obtained illumination values.

The image modifier may be configured to update the current frame image by reflecting a scene change in the current frame image in response to determining, based on the previous frame image and the current frame image, that the scene change occurs from the previous frame image to the current frame image.

According to an aspect of another exemplary embodiment, there is provided a method of processing image data, the method including: obtaining first characteristic values respectively of a plurality of regions of a first image by sequentially calculating characteristic values corresponding to pixels included in each of the plurality of regions; obtaining, based on the obtained first characteristic values, an illumination image related to the first image or a second image that is a following image of the first image; and modifying, based on the obtained illumination image, the second image.

The obtaining the first characteristic values may include: obtaining a first pixel value of a first pixel included in a first region from among the plurality of regions of the first image while sequentially receiving pixel values of pixels included in the first region; obtaining a second pixel value of a second pixel included in the first region while sequentially receiving the pixel values of the pixels included in the first region; determining a cumulative characteristic value based on a weighted sum of the first pixel value and the second pixel value; obtaining a third pixel value of a third pixel included in the first region while sequentially receiving the pixel values of the pixels included in the first region; and updating the cumulative characteristic value based on a weighed sum of the cumulative characteristic value and the third pixel value.

The obtaining the illumination image may include obtaining a pixel value of an illumination pixel included in the illumination image based on first characteristic values, among the obtained first characteristic values, of a predetermined number of regions, which are most adjacent to the illumination pixel, from among the plurality of regions.

The obtaining the illumination image may further include performing linear interpolation on intervals between the illumination pixel and the predetermined number of regions.

The method may further include: obtaining second characteristic values respectively of a plurality of regions of a second image by sequentially calculating characteristic values corresponding to pixels included in each of the plurality of regions; and obtaining third characteristic values respectively of corresponding regions, from among the plurality of regions of the first image and the plurality of regions of the second image, based respectively on the first characteristic values and the second characteristic values of the corresponding regions, wherein the obtaining the illumination image may be performed based on the third characteristic values obtained based on the first characteristic values.

The modifying may include: obtaining reflectance pixel values based on the third characteristic values and the pixel values of the pixels included in each of the plurality of regions of the second image; obtaining output pixel values based on a weighted sum of the third characteristic values and the reflectance pixel values; and modifying the second image based on the obtaining output pixel values.

The method may further include storing the obtained first characteristic values in a register.

The modifying may include: determining whether at least a predetermined proportion of pixel values of the pixels included in each of the plurality of regions of the first image are within a predetermined range; and determining whether to modify the second image based on a result of the determining whether the at least the predetermined proportion of the pixel values are within the predetermined range.

The determining whether to modify the second image may include skipping the modifying of the second image in response to determining that the at least the predetermined proportion of the pixel values are within the predetermined range.

The first image may be an image of a previous frame and the second image may be an image of a current frame.

According to an aspect of another exemplary embodiment, there is provided a non-transitory computer-readable recording medium having recorded thereon a program, which when executed by a computer, performs the above method.

BRIEF DESCRIPTION OF THE DRAWINGS

These and/or other aspects will become apparent and more readily appreciated from the following description of the exemplary embodiments, taken in conjunction with the accompanying drawings in which:

FIG. 10 is a flowchart of a method of performing, by a device, a retinex operation, according to one or more exemplary embodiments;

FIG. 17 is a flowchart of a method of updating, by a device, a current frame image by reflecting a scene change, according to one or more exemplary embodiments.

DETAILED DESCRIPTION OF EXEMPLARY EMBODIMENTS

Figure 1:
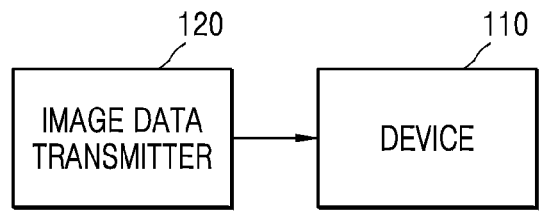
FIG. 1 is a diagram for describing a method and device for processing image data according to one or more exemplary embodiments.

Hereinafter, according to one or more exemplary embodiments, an 'image' may comprehensively include not only a still image, but also a moving image, such as a video.

Methods and devices for processing image data, according to one or more exemplary embodiments, will now be described with reference to FIGS. 1 through 15.

As used herein, the singular forms "a," "an" and "the" are intended to include the plural forms as well, unless the context clearly indicates otherwise. Furthermore, it is understood that expressions such as "at least one of," when preceding a list of elements, modify the entire list of elements and do not modify the individual elements of the list.

One or more exemplary embodiments will be described below in more detail with reference to the accompanying drawings. Those components that are the same or are in correspondence are rendered the same reference numeral regardless of the figure number, and redundant explanations are omitted.

FIG. 1 is a diagram for describing a method and device 110 for processing image data according to one or more exemplary embodiments.

Referring to FIG. 1, an image data transmitter 120 may transmit image data to the device 110. The device 110 may process the image data received from the image data transmitter 120. The device 110 may receive the image data from the image data transmitter 120 and, at the same time, process the image data received from the image data transmitter 120 in real-time.

A method of processing image data according to an exemplary embodiment, which is performed by the device 110, will be described below.

Figure 2:
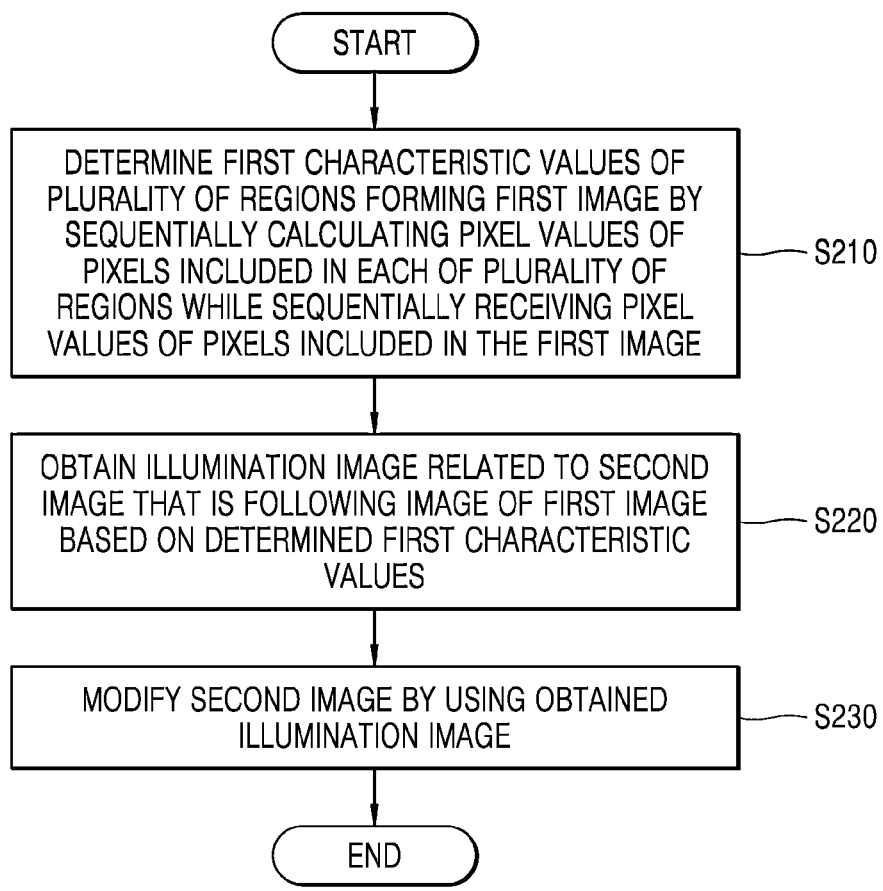
FIG. 2 is a flowchart of a method of modifying, by a device, an image by obtaining an illumination image, according to one or more exemplary embodiments.

FIG. 2 is a flowchart of a method of modifying, by the device 110, an image by obtaining an illumination image, according to one or more exemplary embodiments.

Referring to FIG. 2, in operation S210, the device 110 determines first characteristic values of a plurality of regions forming (e.g., included in) a first image by sequentially calculating pixel values of pixels included in each of the plurality of regions while sequentially receiving pixel values of pixels included in the first image.

The device 110 may sequentially receive the pixel values of the pixels included in the first image. The device 110 may sequentially calculate pixel values of the pixels included in each of the plurality of regions forming the first image (e.g., may calculate characteristic values (cumulative characteristic values) corresponding to each of the pixel values of the pixels), from among the sequentially received pixel values of the pixels included in the first image. For example, the device 110 may determine the first characteristic value of a first region forming the first image by sequentially calculating pixel values (e.g., characteristic value) of pixels included in the first region forming the first image.

For example, the device 110 may calculate the pixel values by using an equation curr_accum_illum= (a*prev_accum_illum)+((1−a)*curr_pix). Here, curr_accum_illum may denote a cumulative characteristic value of a current pixel, prv_accum_illum may denote a cumulative characteristic value of a previous pixel, curr_pix may denote a pixel value of the current pixel, and a may be a coefficient between 0 and 1. When the device 110 sequentially receives the pixel values, the device 110 may obtain the cumulative characteristic value (curr_accum_illum) of the current pixel by performing a weighted sum on the current pixel value (curr_pix) and the cumulative characteristic value (prev_accum_illum) of the previous pixel that was calculated when the previous pixel value was received. Also, the cumulative characteristic value obtained by calculating all of the pixels included in the first region forming the first image may be referred to as the first characteristic value of the first region. When a pixel value denotes brightness information of a pixel, the first characteristic value of the first region may denote an average brightness value of the first region.

Since a result value obtained by continuously calculating pixel values whenever the pixel values are received is used, the device 110 may continuously calculate the pixel values without having to store the pixel values that have been calculated in a memory.

The first characteristic value determined by the device 110 may denote a value related to an average brightness of the first region.

For example, a pixel value of a certain pixel may denote brightness information of the certain pixel. Also, since the first characteristic value is determined by using brightness information, the first characteristic value may be a value related to brightness of the first region.

Furthermore, the first characteristic value determined by the device 110 may be determined after the device 110 calculates all of the pixel values of the pixels of the first region.

The device 110 may store, in a register, the first characteristic value determined after the device 110 calculates all of the pixel values of the pixels of the first region.

The device 110 may determine a plurality of first characteristic values respectively corresponding to the plurality of regions forming the first image. Also, the device 110 may store the plurality of first characteristic values respectively corresponding to the plurality of regions forming the first image.

The number of first characteristic values corresponding to one region of the first image may be one.

The plurality of regions forming the first image may be set such that the plurality of regions do not overlap each other while filling the first image without a gap. For example, the plurality of regions forming the first image may have rectangular shapes having the same size. The device 110 may set the plurality of regions by dividing the first image into M×N rectangles or squares.

In operation S220, the device 110 obtains an illumination image related to a first image or a second image that is a following image of the first image, based on the first characteristic values determined in operation S210.

The illumination image may be an image related to brightness obtained by using the first characteristic values. The illumination image may be an image related to brightness of each of the plurality of regions forming the first image, which is obtained by using the first characteristic values. In order to obtain the illumination image, the device 110 may calculate each of pixel values of pixels forming the illumination image.

In order to obtain the illumination image, the device 110 may use the first characteristic values determined in operation S210. For example, in order to determine a pixel value of a first illumination pixel that is an arbitrary illumination pixel forming (e.g., included in) the illumination image, the device 110 may obtain the pixel value of the first illumination pixel by using first characteristic values of regions most adjacent to the first illumination pixel, from among the first characteristic values determined in operation S210.

Alternatively, in order to determine the pixel value of the first illumination pixel, the device 110 may obtain the pixel value of the first illumination pixel by using first characteristic values of four regions most adjacent to the first illumination pixel, from among the first characteristic values determined in operation S210, and performing linear interpolation on the first characteristic values based on intervals between the first illumination pixel and the four regions most adjacent to the first illumination pixel.

The linear interpolation may be performed by using a related art linear interpolation. However, it is understood that one or more other exemplary embodiments are not limited thereto. For example, an illumination pixel value may be obtained by using first characteristic values of regions adjacent to the illumination pixel not only via linear interpolation, but also via any one of various related art interpolation methods.

In operation S220, the device 110 may obtain a smoothed image compared to an image obtained by only using the first characteristic values obtained in operation S210, as will be described in detail below with reference to FIG. 12.

The device 110 may obtain an illumination image by using a previous frame image. The device 110 may predict an illumination image of a current frame image by using a previous frame image.

In operation S230, the device 110 modifies the second image (i.e., that follows the first image) by using the illumination image obtained in operation S220.

The first image may be a previous frame image and the second image may be a current frame image.

For example, the device 110 may modify the second image that is the current frame image by using the illumination image obtained from the first image that is the previous frame image.

Alternatively, the device 110 may modify pixel values of pixels forming the second image by using differences between pixel values of pixels forming the illumination image obtained from the first image and the pixel values of the pixels forming the second image.

The second image modified in operation S230 may be clearer than the original second image. For example, the second image modified in operation S230 may have a brightness adjusted according to regions as compared to the second image before being modified. As the brightness of the second image is adjusted according to regions, objects may be more clearly displayed in the second image modified in operation S230 as compared to the second image before being modified. As such, the device 110 may obtain an image that is adaptively clarified according to characteristic values according to regions of the image by adjusting brightness according to the regions.

Figure 3:
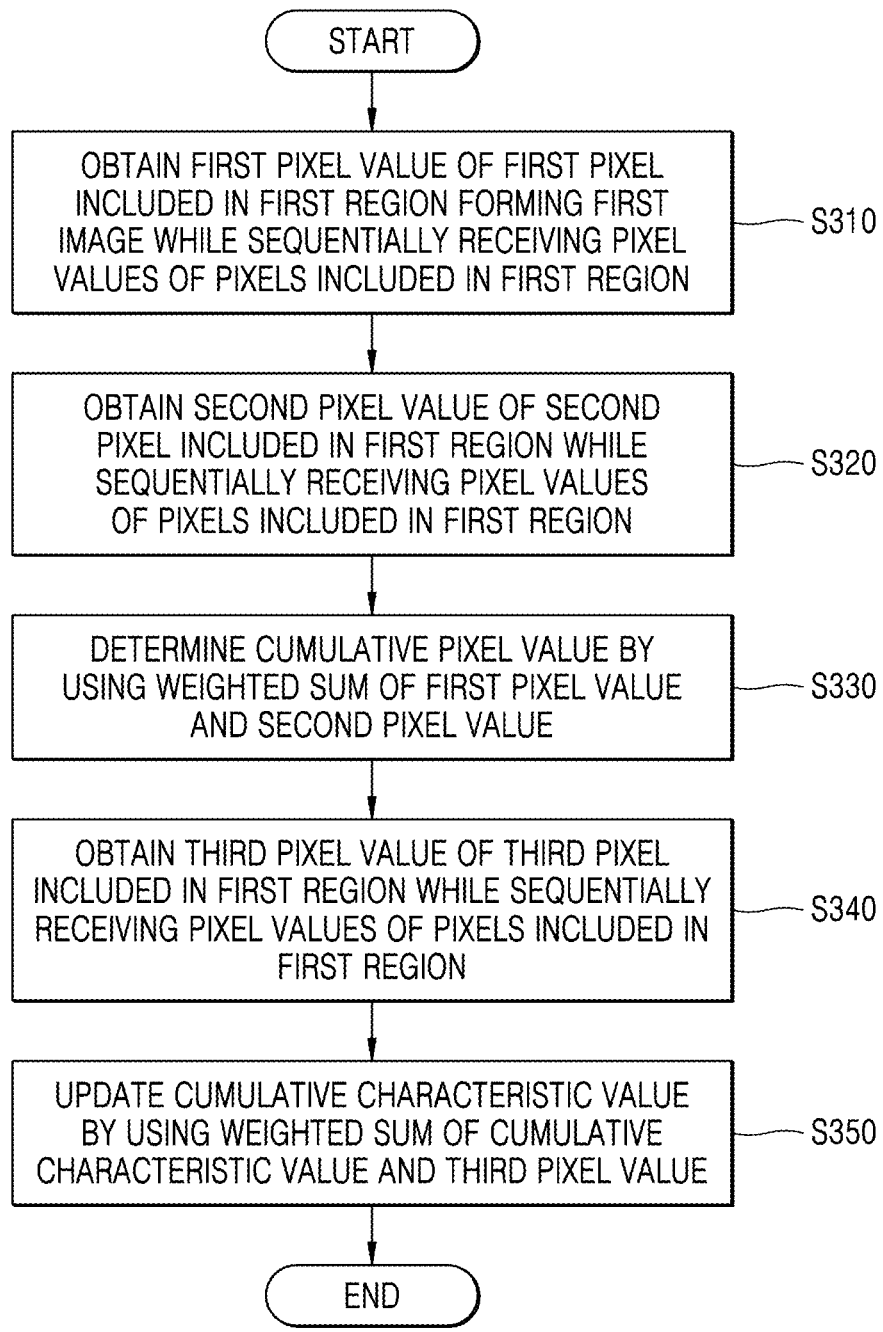
FIG. 3 is a flowchart of a method of determining, by a device, a characteristic value of a certain region, according to one or more exemplary embodiments.

FIG. 3 is a flowchart of a method of determining, by the device 110, a characteristic value of a certain region, according to one or more exemplary embodiments.

Referring to FIG. 3, in operation S310, the device 110 obtains a first pixel value of a first pixel included in a first region forming a first image, while sequentially receiving pixel values of pixels included in the first region. The first region may be one of a plurality of regions forming (e.g., included in) the first image, and the first pixel may be one of a plurality of pixels forming (e.g., included in) the first region. The first pixel value may be a pixel value of the first pixel.

For example, the device 110 may obtain a pixel value of an arbitrary pixel included in an arbitrary region forming the first image.

In operation S320, the device 110 obtains a second pixel value of a second pixel included in the first image while sequentially receiving the pixel values of the pixels included in the first region. The first region may be one of the plurality of regions forming the first image, and the second pixel may be one of the plurality of pixels forming the first region. The second pixel value may be a pixel value of the second pixel. The second pixel may be different from the first pixel.

For example, the device 110 may obtain a pixel value of an arbitrary pixel different from the first pixel included in an arbitrary region forming the first image.

Alternatively, the device 110 may obtain pixel values of two different pixels in one arbitrary region forming the first image in operations S310 and S320.

The first and second pixel values may be pixel values that are sequentially received by the device 110. For example, the device 110 may receive the second pixel value immediately after the first pixel value is received.

In operation S330, the device 110 determines a cumulative characteristic value by using a weighted sum of the first pixel value obtained in operation S310 and the second pixel value obtained in operation S320.

In operation S340, the device 110 obtains a third pixel value of a third pixel included in the first region while sequentially receiving the pixel values of the pixels included in the first region. The third pixel value may be obtained in the same manner as the second pixel value is obtained in operation S320.

The first region may be one of the plurality of regions forming the first image, and the third pixel may be one of the plurality of pixels forming the first region. The third pixel value may be a pixel value of the third pixel. The third pixel may be a pixel different from the first and second pixels.

The device 110 may obtain the third pixel value after the first and second pixel values are obtained.

In operation S350, the device 110 updates the cumulative characteristic value by using a weighted sum of the cumulative characteristic value obtained in operation S330 and the third pixel value obtained in operation S340.

The device 110 may update a cumulative characteristic value that is previously obtained by using a weighted sum of the cumulative characteristic value that is previously obtained and a pixel value that is newly obtained.

Figure 4:
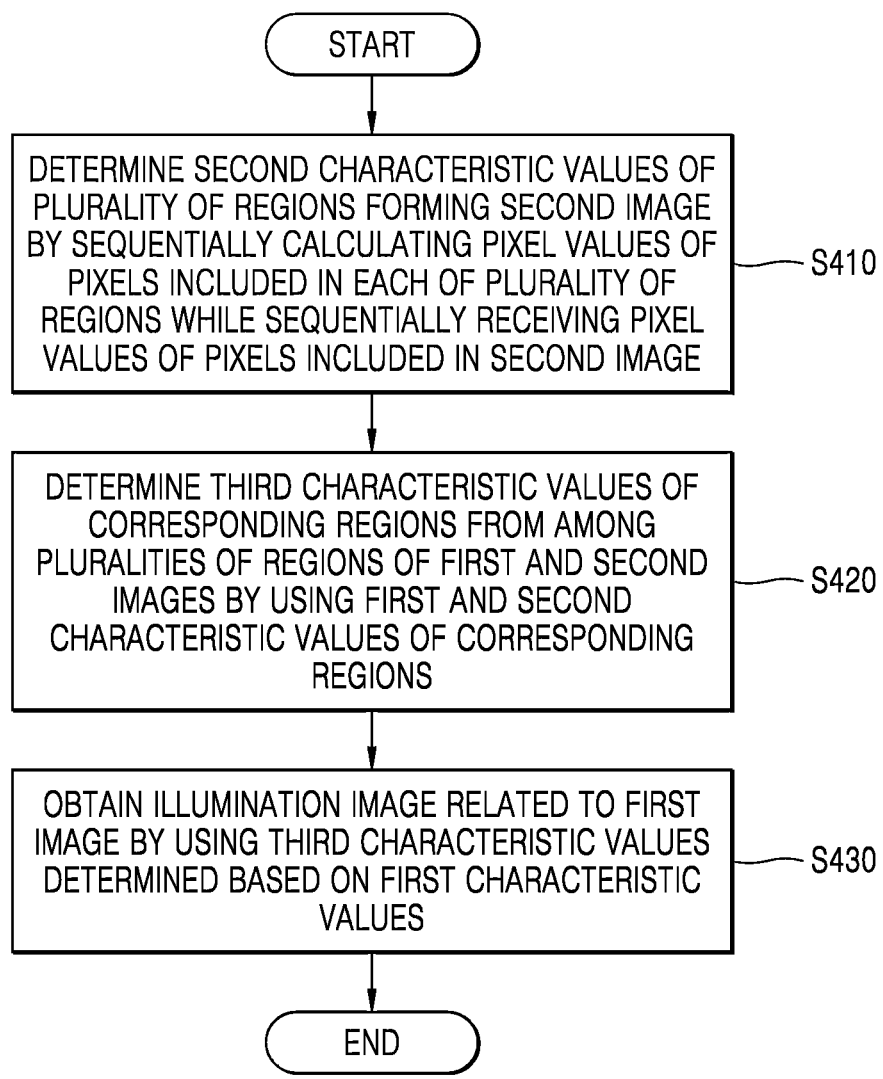
FIG. 4 is a flowchart of a method of obtaining, by a device, an illumination image, according to one or more exemplary embodiments.

FIG. 4 is a flowchart of a method of obtaining, by the device 110, an illumination image, according to one or more exemplary embodiments.

In operation S410, the device 110 may determine second characteristic values of a plurality of regions forming a second image by sequentially calculating pixel values of pixels included in each of the plurality of regions while sequentially receiving pixel values of pixels included in the second image.

The second characteristic values may be determined in the same manner as the first characteristic values are determined in operation S210 (FIG. 2).

The second image may be a following image of the first image. Also, the first image may be the previous frame image and the second image may be the current frame image.

In operation S420, the device 110 may determine third characteristic values of corresponding regions from among the pluralities of regions of the first and second images by using the first and second characteristic values of the corresponding regions.

The device 110 may detect a drastic change between the first and second images by comparing the first and second characteristic values of the corresponding regions from among the pluralities of regions of the first and second images.

In order to modify a current frame image by reflecting a drastic change between a previous frame image and the current frame image, the device 110 may compare first and second characteristic values of corresponding regions from among pluralities of regions of the previous frame image and the current frame image.

Each of the first characteristic values may denote a value respectively corresponding to each of the regions forming the first image, and each of the second characteristic values may denote a value respectively corresponding to each of the regions forming the second image. Each of the regions forming the first image and each of the regions forming the second image may respectively correspond to each other. Also, the device 110 may determine the third characteristic values of the corresponding regions by using the first and second characteristic values. For example, the device 110 may determine a third characteristic value by using a first characteristic value of a second region forming a first image and a second characteristic value of a third region, corresponding to the second region, from among a plurality of regions forming a second image.

For example, the device 110 may determine a third characteristic value (final_illum) by using a weighted sum of a first characteristic value (illum) obtained based on a previous frame image and a second characteristic value (accum_illum) obtained based on a current frame image, with respect to corresponding regions.

For example, the device 110 may determine a third characteristic value by using Equation 1 below.

$$\text{final\_illum} = \left( \frac{|\text{illum} - \text{accum\_illum}|}{\text{max\_diff}} \times \text{accum\_illum} \right) + \quad \text{[Equation 1]}$$
$$\left( \left( 1 - \frac{|\text{illum} - \text{accum\_illum}|}{\text{max\_diff}} \right) \times \text{illum} \right)$$

Here, illum may denote a first characteristic value, accum_illum may denote a second characteristic value, and final_illum may denote a third characteristic value. Also, max_diff may denote a maximum difference between pixel values. Alternatively, max_diff may denote a threshold value for determining a scene change.

According to Equation 1, the device 110 may determine the third characteristic value (final_illum) by using the weighted sum of the first characteristic value (illum) obtained based on the first image and the second characteristic value (accum_illum) obtained based on the second image, with respect to corresponding regions.

In operation S430, the device 110 may obtain an illumination image related to the first image by using the third characteristic values determined based on the first characteristic values.

The device 110 may obtain the illumination image by using the third characteristic values determined in operation S420. Since the third characteristic values are obtained by using not only the pixel values of the first image, but also the pixel values of the second image, the illumination image obtained by using the third characteristic values may reflect a situation or characteristic of the second image.

The first image may denote the previous frame image and the second image may denote the current frame image. Accordingly, unlike an illumination image obtained by only using the first characteristic values, the illumination image obtained by using the third characteristic values may reflect the pixel values of the second image. Since the third characteristic value is obtained by using both the first and second characteristic values, the device 110 may use the first characteristic value while obtaining the third characteristic value.

Furthermore, since the illumination image obtained in operation S430 is obtained by using the third characteristic values, the illumination image may reflect pixel values of a current frame image. Thus, when there is a pixel value that is drastically changed as a previous frame image is changed to the current frame image, an illumination image that considers the drastic change of the pixel value may be obtained. The device 110 may obtain the illumination image that considers both a pixel value of the previous frame image and a pixel value of the current frame image.

For example, when no pixel value is changed when the previous frame image is changed to the current frame image, there is no difference between the first characteristic value (illum) and the second characteristic value (accum_illum) in Equation 1. Thus, a value of illum−accum_illum is 0. Accordingly, the third characteristic value (final_illum) has the same value as the first characteristic value (illum), and the second characteristic value (accum_illum) is not reflected in the third characteristic value. When no pixel value is changed when the previous frame image is changed to the current frame image, the device 110 may obtain the illumination image by only using pixel values of the previous frame image without considering pixel values of the current frame image.

Alternatively, when the first and second characteristic values are changed by max_diff as the previous frame image is changed to the current frame image, a difference between the first characteristic value (illum) and the second characteristic value (accum_illum) in Equation 1 is max_diff. In other words, when there is a scene change, the difference between the first characteristic value (illum) and the second characteristic value (accum_illum) is max_diff. Alternatively, when the difference between the first characteristic value (illum) and the second characteristic value (accum_illum) is max_diff, the device 110 may determine that there is a scene change. Accordingly, when the difference between the first characteristic value (illum) and the second characteristic value (accum_illum) is max_diff, a value of $$\frac{|\text{illum} - \text{accum\_illum}|}{\text{max\_diff}}$$

is 1. Accordingly, the third characteristic value (final_illum) has the same value as the second characteristic value (accum_illum), and the first characteristic value (illum) is not reflected in the third characteristic value. When a pixel value is changed by a maximum value as the previous frame image is changed to the current frame image, the device 110 may obtain an illumination image by only using the pixel values of the current frame image without considering the pixel values of the previous frame image.

In other words, when max_diff denotes a threshold value for determining a scene change, the device 110 may adjust a standard for determining a scene change by adjusting max_diff.

Alternatively, when the first and second characteristic values are changed by max_diff×k (wherein k is a real number between 0 and 1) as the previous frame image is changed to the current frame image, the difference between the first characteristic value (illum) and the second characteristic value (accum_illum) in Equation 1 is max_diff×k. Thus, the value of $$\frac{|\text{illum} - \text{accum\_illum}|}{\text{max\_diff}}$$

is k. Accordingly, the third characteristic value (final_illum) may be determined as a result of a weighted sum of the first characteristic value (illum) and the second characteristic value (accum_illum). When a pixel value is changed by max_diff×k (wherein k is a real number between 0 and 1) as the previous frame image is changed to the current frame image, the device 110 may obtain the illumination image by using both the pixel values of the previous frame image and the pixel values of the current frame image.

Figure 5:
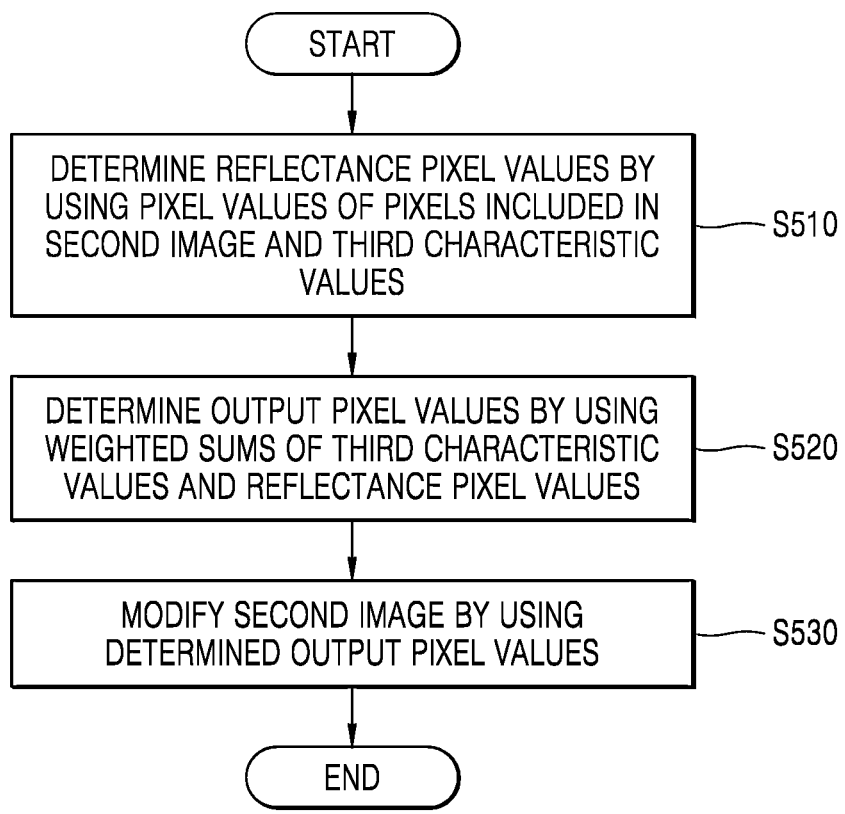
FIG. 5 is a flowchart of a method of modifying an image by using a characteristic value and a reflectance pixel value, according to one or more exemplary embodiments.

FIG. 5 is a flowchart of a method of modifying an image by using a characteristic value and a reflectance pixel value, according to one or more exemplary embodiments. In FIG. 5, first through third characteristic values may be the same as those described above with reference to FIG. 4.

Referring to FIG. 5, in operation S510, the device 110 may determine reflectance pixel values of a second image by using pixel values of pixels included in the second image and third characteristic values.

Here, a first image may denote a previous frame image and the second image may denote a current frame image.

The device 110 may obtain pixel values of pixels forming an illumination image by using the third characteristic values. When illum_img denotes the pixel value of the pixels forming the illumination image and final_illum denotes the third characteristic value, for example, an equation "illum_img=log(final_illum)" may be established or implemented.

Then, the device 110 may determine the reflectance pixel values of the second image by using the pixel values of the pixels included in the second image and the pixel values of the pixels forming the illumination image. When ref_img denotes the reflectance pixel value and input denotes an input pixel value, for example, an equation "ref_img=log (input)−illum_img" may be established or implemented.

According to above example, the device 110 obtains the pixel value (illum_img) of the pixel forming the illumination image by applying a log on the third characteristic value (final_illum), and obtains the reflectance pixel value (ref_img) by using the pixel value (illum_img) of the pixel forming the illumination image and the input pixel value (input). Accordingly, when the second image is a current frame image, the input pixel value (input) denotes the pixel value of the pixel included in the second image, and thus the device 110 may determine the reflectance pixel values by using the pixel values of the pixels included in the second image and the third characteristic values.

In operation S520, the device 110 may determine output pixel values by using weighted sums of the third characteristic values and the reflectance pixel values.

For example, when out denotes an output pixel value, ref_img denotes a reflectance pixel value, illum_img denotes a pixel value of a pixel forming an illumination image, and a, b, and x denote three types of coefficients, an equation "out=exp((ref_img+b)*a+illum_img*x)" may be established or implemented. Also, as described above, when illum_img=log(final_illum), the device 110 may obtain the output pixel value (out) by using the weighted sum of the reflectance pixel value and the third characteristic value (final_illum).

In operation S530, the device 110 may modify the second image by using the determined output pixel values.

The device 110 may obtain a current image by using the output pixel values determined in operation S520, or modify the current image by using the output pixel values determined in operation S520. The second image may denote a current frame image.

Figure 6:
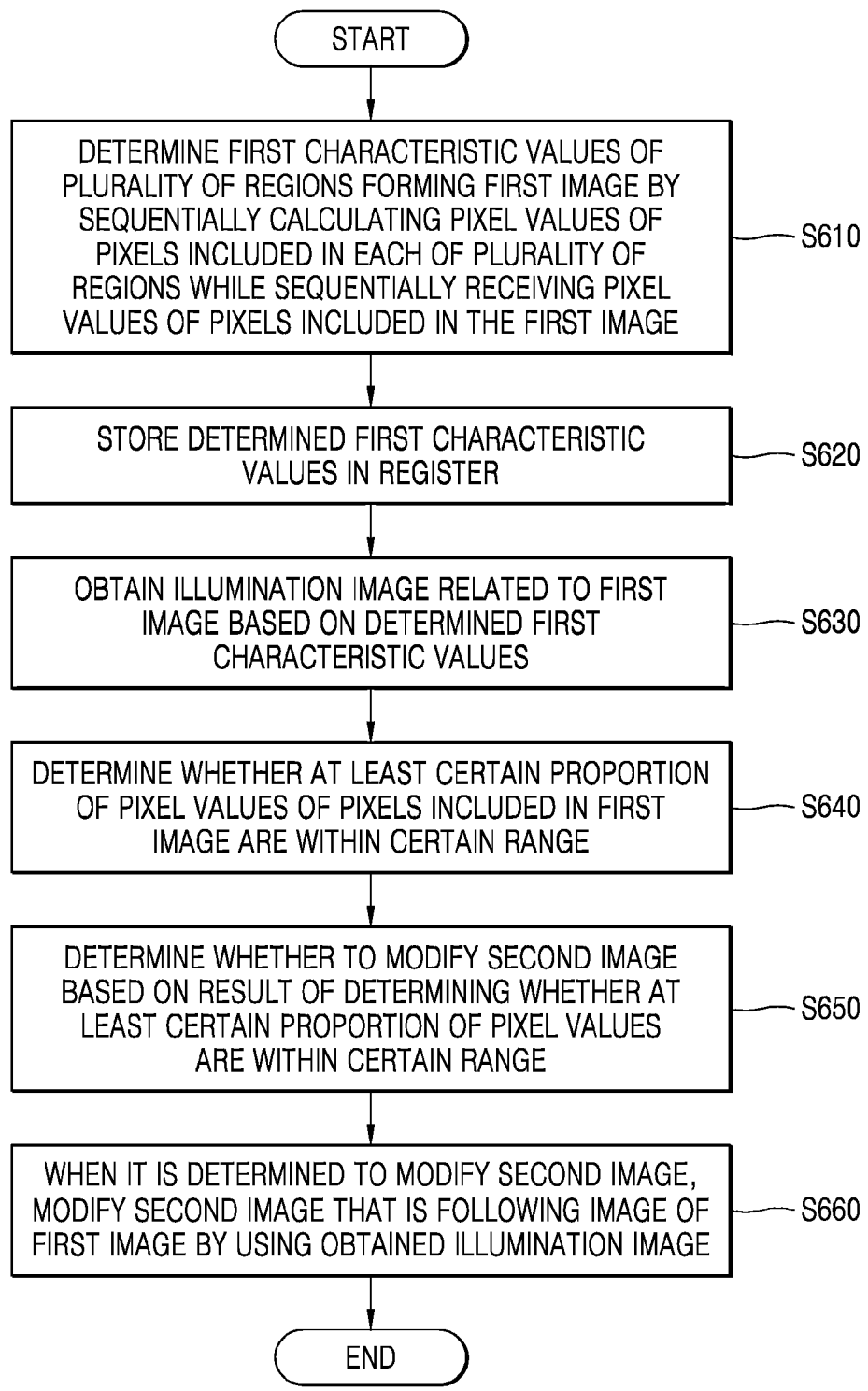
FIG. 6 is a flowchart of a method of determining, by a device, whether to modify an image by determining whether at least a certain proportion of pixel values of pixels included in the image are within a certain range, according to one or more exemplary embodiments.

FIG. 6 is a flowchart of a method of determining, by the device 100, whether to modify an image by determining whether at least a certain proportion of pixel values of pixels included in the image are within a certain range, according to one or more exemplary embodiments.

Since operations S610 and S630 respectively correspond to operations S210 and S220 (FIG. 2), redundant details about operations S610 and S630 are not provided again.

Referring to FIG. 6, in operation S620, the device 110 stores the first characteristic values determined in operation S610 in a register.

The register may be a type of temporary storage space of data, which is disposed (e.g., included) in the device 110.

In operation S640, the device 110 determines whether at least the certain proportion of the pixel values of the pixels included in the first image are within a certain (e.g., predetermined) range.

When an image has a simple background, the device 110 may determine that at least a certain (e.g., predetermined) proportion of pixel values of pixels included in the image are within a certain range.

For example, the device 110 may calculate a proportion of pixel values having a brightness value equal to or greater than a certain threshold value by calculating whether each pixel value has a brightness value equal to or greater than the certain threshold value in order to determine whether an image has a bright background.

Alternatively, when pixel values of pixels included in a first image have a brightness value from 1 to 256, the device 110 may determine that at least a certain proportion of the pixel values of the pixels included in the first image are within a certain range if at least 80% of the pixel values of the pixels included in the first image have a brightness value equal to or higher than 210.

Alternatively, when pixel values of pixels included in a first image have a brightness value from 1 to 256, the device 110 may determine that at least a certain proportion of the pixel values of the pixels included in the first image are within a certain range if at least 90% of the pixel values of the pixels included in the first image have a brightness value between 220 and 250. According to the current exemplary embodiment, the certain range may be brightness values from 220 to 250, and the certain proportion may be 90%.

Alternatively, when pixel values of pixels included in a first image have a brightness value from 1 to 256, the device 110 may determine that at least a certain proportion of the pixel values of the pixels included in the first image are within a certain range if at least 40% of the pixel values have a brightness value between 220 and 250 and at least 20% of the pixel values have a brightness value between 20 and 50. When there are only two pixel values (e.g., as in prints and a background in an e-book), the device 110 may determine that at least a certain proportion of pixel values of pixels included in an image are within a certain range.

In operation S650, the device 110 determines whether to modify a second image based on a result of the determining in operation S640.

When it is determined that at least the certain proportion of the pixel values are within the certain range in operation S640, the device 110 does not modify the second image, and when it is determined that at least the certain proportion of the pixel values are not within the certain range in operation S640, the device 110 modifies the second image.

When it is determined that at least the certain proportion of the pixel values are within the certain range in operation S640, the device 110 may skip modifying the second image.

Thus, fonts, for example, may be prevented from being changed in an image, an e-book image, or a web image with many letters.

For example, when pixel values of most (e.g., more than predetermined number) pixels included in the first image have at least a certain brightness value, the device 110 may determine not to modify the second image. When an e-book image is the first image, a proportion of pixel values having a bright brightness value of white may be high, and thus the device 110 may determine not to modify the second image by determining at least a certain proportion of pixel values have at least a certain brightness value.

Alternatively, the device 110 may determine not to modify the second image when pixel values of most pixels included in the first image have at least a certain brightness value. When a webpage image is the first image, a proportion of pixel values having a bright brightness value of white may be high, and thus the device 110 may determine not to modify the second image by determining at least a certain proportion of pixel values have at least a certain brightness value. When the device 110 determines not to modify the second image, the device 110 may skip modifying the second image.

Alternatively, the device 110 may determine not to modify the second image when pixel values of most pixels included in the first image have at least a certain brightness value. For example, when a mountain image is the first image, a proportion of pixel values having a brightness value within a certain range may not be high, and thus the device 110 may determine to modify the second image by determining that at least a certain proportion of pixels values do not have at least a certain brightness value.

When it is determined to modify the second image in operation S650, the device 110 modifies the second image that is a following image of the first image in operation S660 by using the illumination image obtained in operation S630. The first image may be a previous frame image and the second image may be a current frame image.

The second image may be modified in operation S660 in the same manner described above with reference to operation S230 (FIG. 2).

The device 110 may modify the second image in operation S660 by using the illumination image obtained in operation S630 only when it is determined to modify the second image in operation S650.

For example, the device 110 may determine whether to modify a current frame image based on a result of determining whether at least a certain proportion of pixel values of pixels included in a previous frame image are within a certain range.

Figure 7:
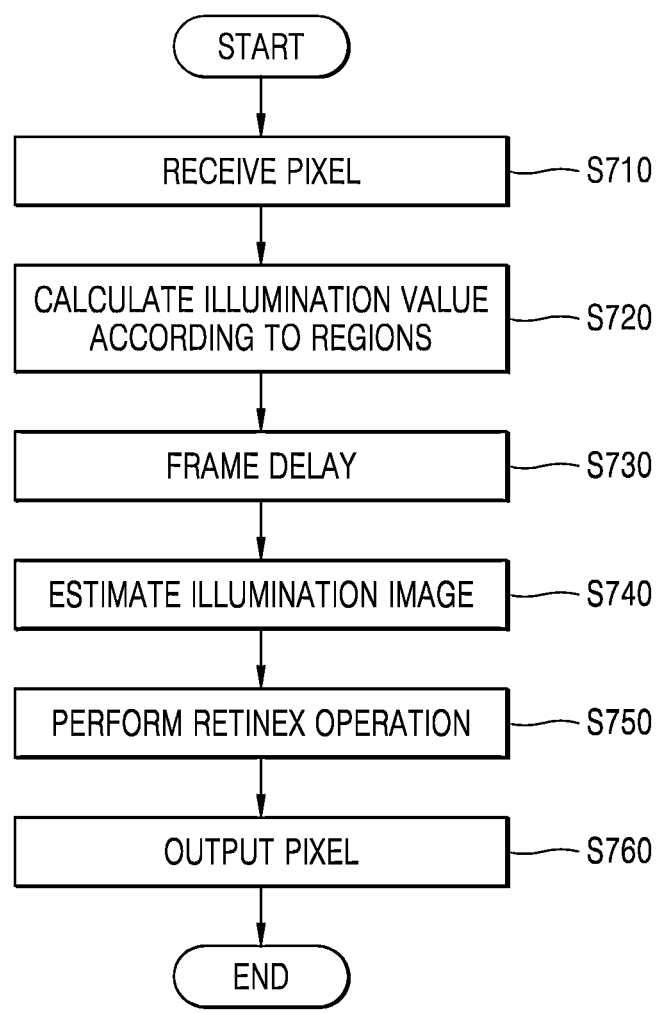
FIG. 7 is a flowchart of a method of estimating, by a device, an illumination image by calculating an illumination value according to regions and performing, by a device, a retinex operation, according to one or more exemplary embodiments.

FIG. 7 is a flowchart of a method of estimating, by the device 110, an illumination image by calculating an illumination value according to regions and performing, by the device 100, a retinex operation, according to one or more exemplary embodiments.

Referring to FIG. 7, in operation S710, the device 110 receives information related to a pixel. For example, the device 110 may receive a pixel value.

In operation S720, the device 110 calculates an illumination value according to regions. The illumination value may be a characteristic value described above. The illumination value may be calculated in the same manner that the first and second characteristic values are determined in operations S210 (FIG. 2) and S410 (FIG. 4) described above.

In operation S730, a frame delay is generated.

In operation S740, the device 110 estimates an illumination image. The illumination image may be estimated in the same manner that the illumination image is obtained by using the first characteristic value and by using the third characteristic value in operations S220 (FIG. 2) and S430 (FIG. 4) described above.

In operation S750, the device 110 performs a retinex operation.

Here, the device 110 may perform a related art retinex operation.

Alternatively, the retinex operation may be performed in the same manner that the second image is modified in operation S230 (FIG. 2) described above.

Alternatively, the retinex operation may be performed in the same manner that the second image is modified by using the output pixel values as described above with reference to FIG. 5.

In operation S760, the device 110 may transmit the information related to the pixel. For example, the device 110 may transmit the pixel value.

Figure 8:
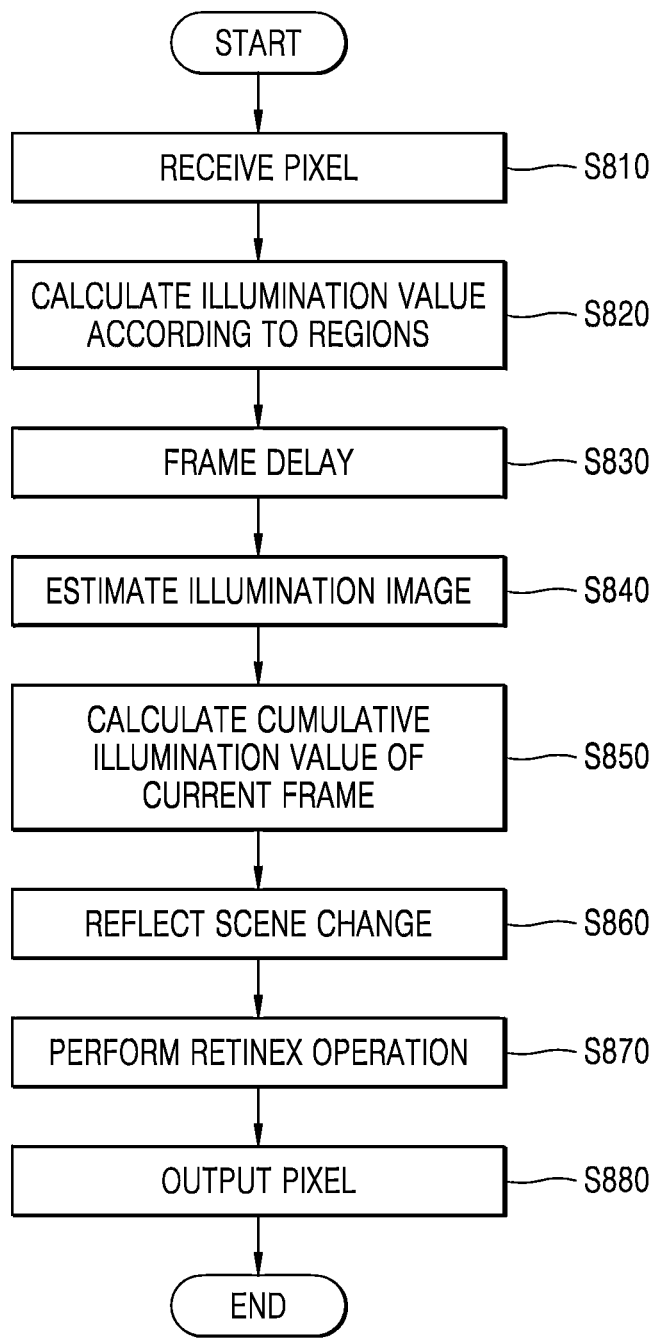
FIG. 8 is a flowchart of a method of performing, by a device, a retinex operation by reflecting a scene change, according to one or more exemplary embodiments.

FIG. 8 is a flowchart of a method of performing, by the device 110, a retinex operation by reflecting a scene change, according to one or more exemplary embodiments.

Since operations S810, S820, S830, S840, S870, and S880 respectively correspond to operations S710, S720, S730, S740, S750, and S760 (FIG. 7), redundant details thereof are not provided again.

Referring to FIG. 8, in operation S850, the device 110 may calculate a cumulative illumination value of a current frame. The cumulative illumination value may be a cumulative characteristic value described above.

A cumulative characteristic value of a previous frame according to an exemplary embodiment has been described above with reference to operation S210 (FIG. 2), and a cumulative characteristic value of a current frame according to an exemplary embodiment has been described above with reference to operation S410 (FIG. 4). According to the present exemplary embodiment, the cumulative illumination value of the current frame may be calculated in the same manner as the second characteristic values are determined in operation S410 (FIG. 4).

In operation S860, the device 110 may reflect a scene change. The scene change may be reflected in the same manner that the illumination image is obtained by considering the pixel values of the previous frame image and the pixel values of the current frame image described above with reference to FIG. 4.

Figure 9:
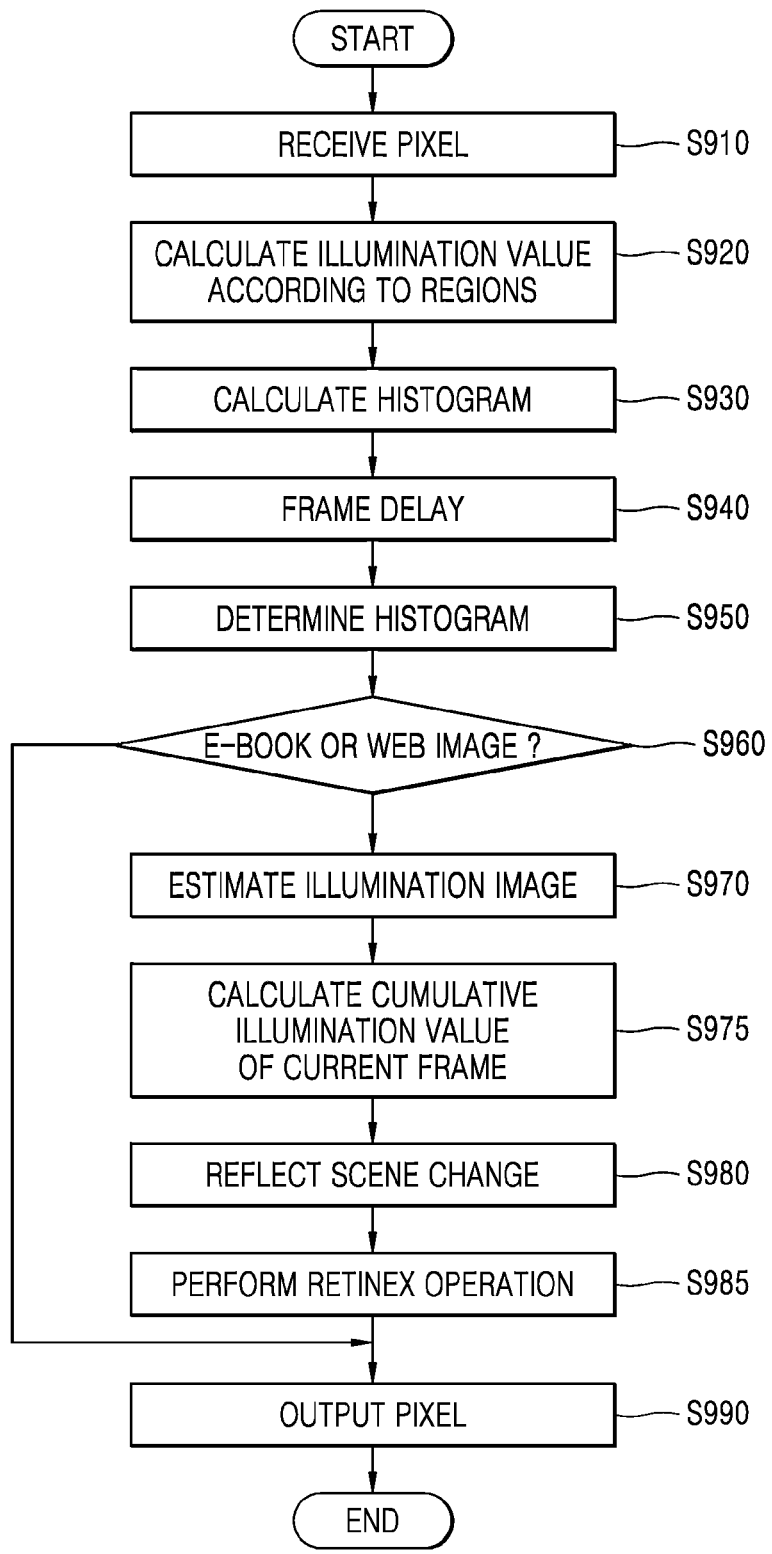
FIG. 9 is a flowchart of a method of determining, by a device, whether to perform a retinex operation by determining whether an image is an E-book image or a web image by using a histogram, according to one or more exemplary embodiments.

FIG. 9 is a flowchart of a method of determining, by the device 110, whether to perform a retinex operation by determining whether an image is an E-book image or a web image by using a histogram, according to one or more exemplary embodiments.

Since operations S910, S920, S940, S970, S975, S980, S985, and S990 respectively correspond to operations S810, S820, S830, S840, S850, S860, S870, and S880 (FIG. 8), redundant details thereof are not provided again.

Referring to FIG. 9, in operation S930, the device 110 calculates a histogram. The histogram may be calculated in the same manner as operation S640 (FIG. 6).

While calculating the histogram in operation S930, the device 110 may perform a calculation to determine whether at least a certain (e.g., predetermined) proportion of pixel values of pixels included in a first image are within a certain (e.g., predetermined) range. Alternatively, the device 110 may perform a calculation to determine whether at least a certain proportion of pixel values of pixels included in a previous frame image are within a certain range.

In operation S950, the device 110 determines the histogram calculated in operation S930. The histogram may be determined in the same manner as operation S650 (FIG. 6).

The device 110 determines the histogram in operation S950 based on a result of the calculating in operation S930. The device 110 may determine whether at least the certain proportion of the pixel values of the pixels included in the first image are within the certain range based on the histogram calculated in operation S930.

In operation S960, the device 110 determines whether an image is an E-book image or a web image. The determining of whether the image is an E-book image or the web image may be performed in the same manner as operation S650 (FIG. 6).

The device 110 may determine whether a previous frame image is an E-book image or a web image based on the histogram determined in operation S950. Alternatively, the device 110 may determine whether a current frame image is an E-book image or a web image based on the histogram determined in operation S950. The device 110 may determine whether a previous frame image or current frame image is an E-book image or a web image based on a result of determining a previous frame image.

For example, the device 110 may determine that the previous frame image or current frame image is an E-book image or a web image when it is determined that at least the certain proportion of the pixel values of the pixels included in the first image are within the certain range in operation S950.

FIG. 10 is a flowchart of a method of performing, by the device 110, a retinex operation, according to one or more exemplary embodiments. The method of FIG. 10 may be performed in the same manner described above with reference to FIG. 5.

Referring to FIG. 10, in operation S1010, the device 110 divides an input image into an illumination image and a reflectance image. The illumination image according to an exemplary embodiment has been described above. The reflectance image may include image components of the input image other than illumination image components.

In operation S1020, the device 110 may modify the illumination image obtained in operation S1010. The illumination image may be modified in operation S1020 by changing a third characteristic value to a log scale.

For example, when illum_img denotes a pixel value of a pixel forming the illumination image and final_illum denotes the third characteristic value, an equation "illum_img=log(final_illum)" may be established or implemented.

In operation S1030, the device 110 may modify the reflectance image obtained in operation S1010. The reflectance image may be modified in operation S1030 by using a log scale.

For example, when illum_img denotes a pixel value of a pixel forming the illumination image, ref_img denotes a reflectance pixel value, and input denotes an input pixel value, an equation "ref_img=log(input)−illum_img" may be established or implemented.

In operation S1040, the device 110 may generate a combined image by combining the illumination image modified in operation S1020 and the reflectance image modified in operation S1030.

The device 110 may combine the illumination image modified in operation S1020 and the reflectance image modified in operation S1030 by using a weighted sum.

In operation S1050, the device 110 may output a result value by combining the input image and the combined image.

Figure 11A:
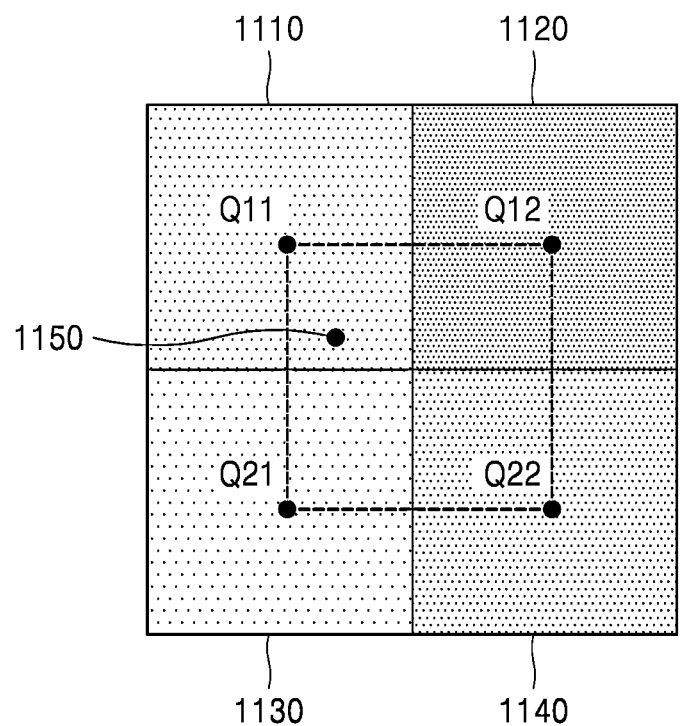
FIG. 11A is a diagram for describing a method of performing, by a device, linear interpolation, according to one or more exemplary embodiments.

FIG. 11A is a diagram for describing a method of performing, by the device 110, linear interpolation, according to one or more exemplary embodiments.

Referring to FIG. 11A, the device 110 may obtain an illumination image by performing linear interpolation using intervals between an input pixel 1150 and center locations Q11 through Q22 of four regions 1110 through 1140 adjacent to the input pixel 1150, a pixel value of the input pixel 1150 in the four regions 1110 through 1140, and a relative location of the input pixel 1150.

The linear interpolation may be performed by using a related art method.

Figure 11B:
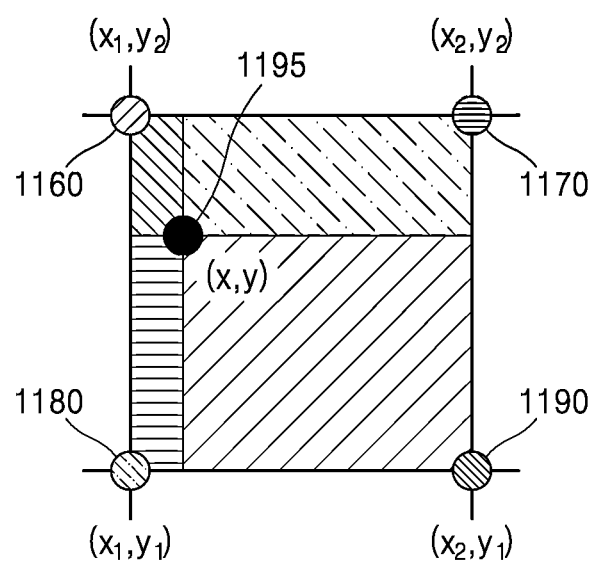
FIG. 11B is a diagram for describing a method of performing, by a device, linear interpolation, according to one or more exemplary embodiments.

FIG. 11B is a diagram for describing a method of performing, by the device 110, linear interpolation, according to one or more exemplary embodiments. The illumination interpolation may be performed in the same manner as FIG. 11A.

Referring to FIG. 11B, the device 110 may obtain an illumination image by performing linear interpolation using intervals between an input pixel 1195 and four representative locations 1160 through 1190 most adjacent to the input pixel 1195, and a pixel value of the input pixel 1195 in the four representative locations 1160 through 1190.

Figure 12A:
FIG. 12A illustrates an original image received by a device, according to one or more exemplary embodiments.

FIG. 12A illustrates an original image received by the device 110, according to one or more exemplary embodiments.

Referring to FIG. 12A, the device 110 may receive image data.

Figure 12B:
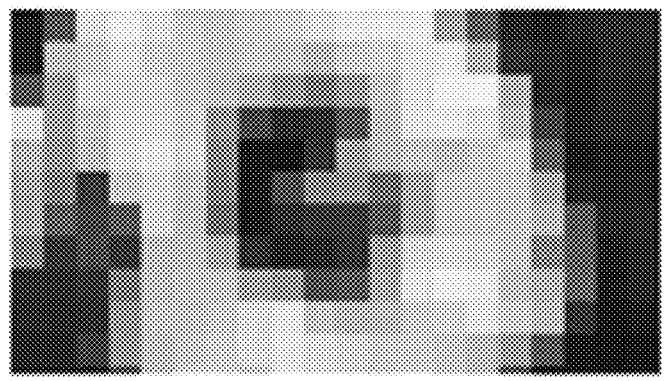
FIG. 12B illustrates an image when a device obtains a characteristic value, according to one or more exemplary embodiments.

FIG. 12B illustrates an image when the device 110 obtains a characteristic value, according to one or more exemplary embodiments. The characteristic value may be obtained in the same manner as operation S210 (FIG. 2) described above.

Referring to FIG. 12B, while sequentially receiving pixel values of pixels included in an image, the device 110 may determine characteristic values of a plurality of regions forming the image by sequentially calculating pixel values of pixels included in each of the plurality of regions. In the image of FIG. 12B, one characteristic value is determined according to each of the plurality of regions forming the image.

Figure 12C:
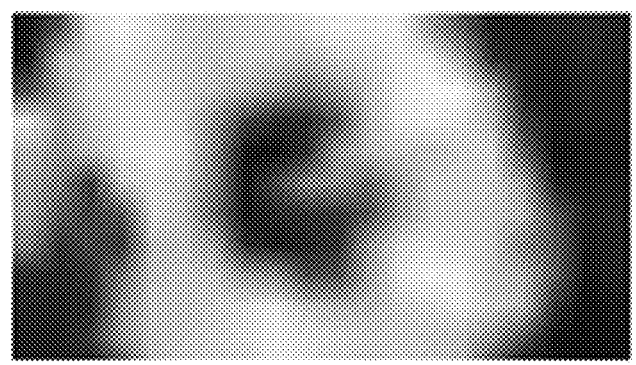
FIG. 12C illustrates an illumination image obtained by a device, according to one or more exemplary embodiments.

FIG. 12C illustrates an illumination image obtained by the device 110, according to one or more exemplary embodiments. The illumination image may be obtained in the same manner as operation S220 (FIG. 2) described above.

Referring to FIG. 12C, the device 110 may obtain the illumination image by using the characteristic values determined in FIG. 12B.

Figure 13A:
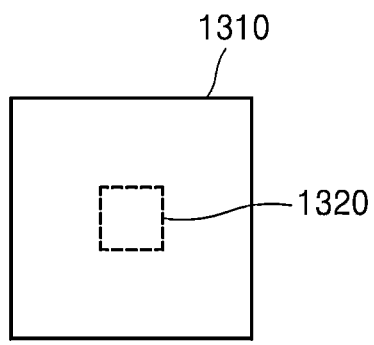
FIG. 13A is a diagram for describing a method of processing, by a device, an image in relation to a scene change, according to one or more exemplary embodiments.
Figure 13B:
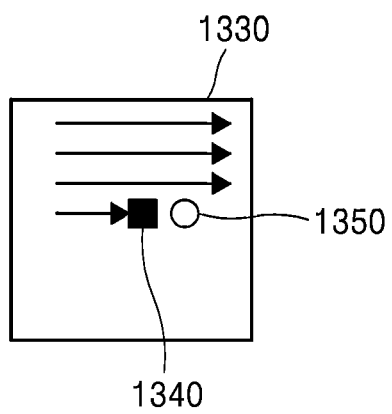
FIG. 13B is a diagram for describing a method of processing, by a device, an image in relation to a scene change, according to one or more exemplary embodiments.

FIGS. 13A and 13B are diagrams for describing a method of processing, by the device 110, an image in relation to a scene change, according to one or more exemplary embodiments. The method of FIGS. 13A and 13B may be performed in the same manner as described above with reference to FIGS. 2 and 4.

Referring to FIGS. 13A and 13B, the device 110 may read pixel values of pixels included in an image in one direction according to a raster scan method so as to use only pixel values of pixels included in each region of a plurality of regions included in the image in calculating illumination values of a relevant region. For example, when a first region and a second region are disposed side by side, the device 110 may read pixels in one line and use only pixel values of a relevant region (e.g., the first region or the second region) in calculating illumination values of the relevant region while determining illumination values of the first and second regions.

While sequentially receiving pixel values of pixels included in a previous frame image 1310, the device 110 determines first characteristic values of each of a plurality of regions forming the previous frame image 1310 by sequentially calculating pixel values of pixels included in each of the plurality of regions. Then, the device 110 may determine the first characteristic value of a certain region 1320 of the previous frame image 1310. Then, the device 110 may store the determined first characteristic value in a register.

While sequentially receiving pixel values of pixels included in a current frame image 1330, the device 110 may determine second characteristic values of a plurality of regions forming the current frame image 1330 by sequentially calculating pixel values of pixels included in each of the plurality of regions.

While determining the second characteristic values, the device 110 may determine a cumulative characteristic value 1340 of the current frame image 1330 with respect to a previous location of a pixel 1350 being processed in the current frame image 1330. The device 110 may determine a degree of a scene change by comparing the cumulative characteristic value 1340 and the characteristic value at the certain region 1320 of the previous frame image 1310, which is obtained from the register. A method of obtaining, by the device 110, different illumination images based on a degree of a scene change may be performed in the same manner as described above with reference to FIG. 4.

Figure 14:
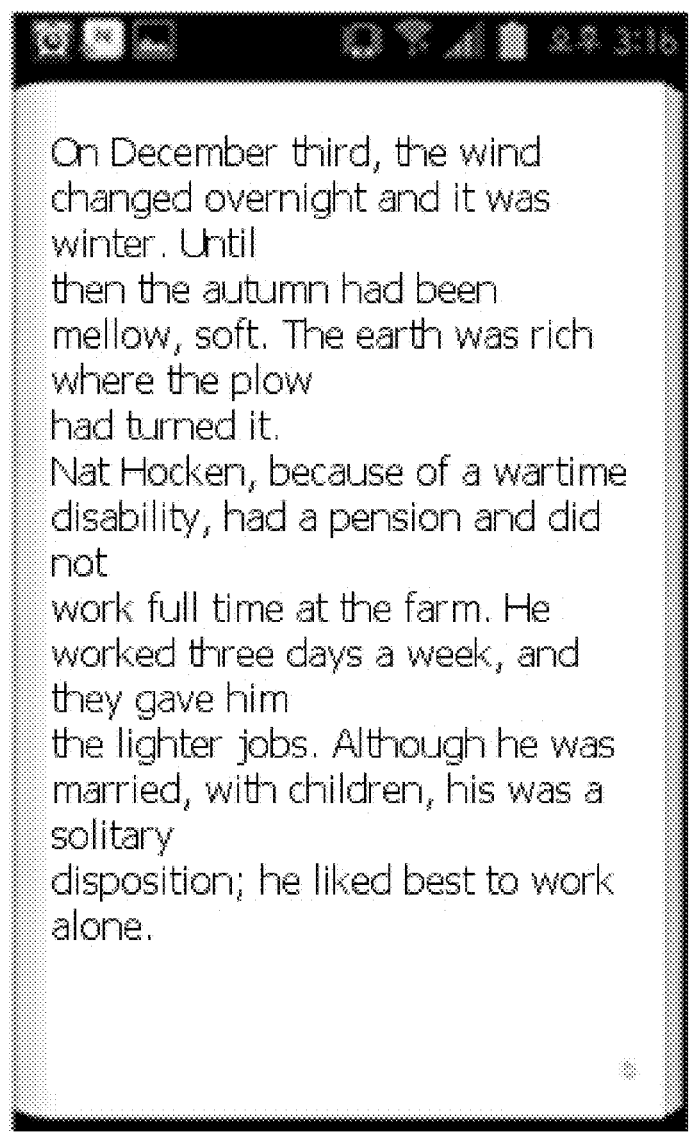
FIG. 14 is a diagram for describing an image recognized as an E-book image by a device, according to one or more exemplary embodiments.

FIG. 14 is a diagram for describing an image recognized as an E-book by the device 110, according to one or more exemplary embodiments.

As shown in FIG. 14, when an image has a simple background, the device 110 may determine that at least a certain proportion of pixel values of pixels included in the image are within a certain range. When it is determined that at least the certain proportion of the pixel values are within the certain range, the device 110 may skip modifying a current frame image by using an illumination image.

Accordingly, a change to fonts in an image having many letters, an e-book image, and a web image may be reduced.

Figure 15:
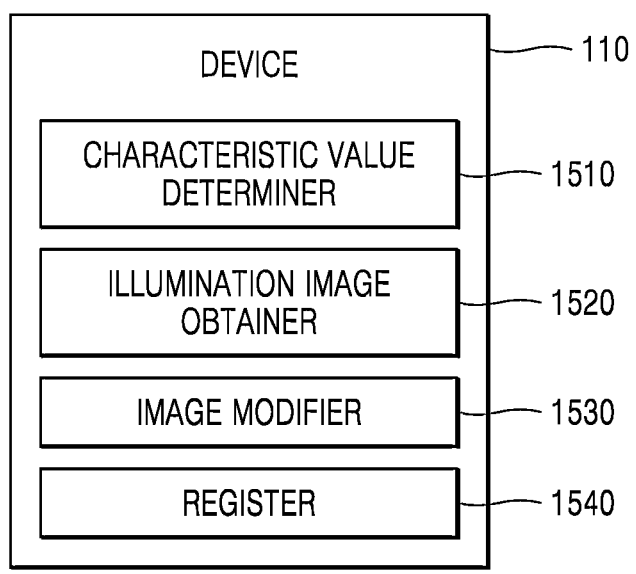
FIG. 15 is a block diagram of a device according to one or more exemplary embodiments.

FIG. 15 is a block diagram of the device 110 according to one or more exemplary embodiments.

The device 110 performs the methods described above, and may have any structure as long as the methods are performable.

As shown in FIG. 15, the device 110 may include a characteristic value determiner 1510, an illumination image obtainer 1520, an image modifier 1530, and a register 1540. However, it is understood that in one or more other exemplary embodiments, the device 110 may include more or less components than those shown in FIG. 15.

The components of the device 110 will now be described in detail.

The characteristic value determiner 1510 may determine first characteristic values of a plurality of regions forming a first image by sequentially calculating pixel values of pixels included in each of the plurality of regions, while sequentially receiving pixel values of pixels included in the first image.

The device 110 may sequentially receive the pixel values of the pixels included in the first image. The characteristic value determiner 1510 of the device 110 may sequentially calculate the pixel values of the pixels included in each of the plurality of regions forming the first image, from among the received pixel values. For example, the characteristic value determiner 1510 may determine the first characteristic value of the first region of the first image by sequentially calculating the pixel values of the pixels included in the first region forming the first image.

For example, the characteristic value determiner 1510 may calculate an equation curr_accum_illum= (a*prev_accum_illum)+((1−a)*curr_pix). Here, curr_accum_illum denotes a cumulative characteristic value of a current pixel, prv_accum_illum denotes a cumulative characteristic value of a previous pixel, curr_pix denotes a pixel value of the current pixel, and a denotes a coefficient between 0 and 1. While sequentially receiving the pixel values, the device 110 may obtain the cumulative characteristic value (curr_accum_illum) of the current pixel by using a weighted sum of the pixel value (curr_pix) of the current pixel and the cumulative characteristic value (pre_accum_illum) of the previous pixel, which was calculated when a previous pixel value was received. The cumulative characteristic value obtained by calculating all of the pixels included in the first region forming the first image may be the first characteristic value of the first region forming the first image. When a pixel value denotes brightness information of a pixel, the first characteristic value of the first region may denote an average brightness value of the first region.

Since only a result value obtained by continuously calculating pixel values whenever the pixel values are received is used, the characteristic value determiner 1510 may continuously calculate the pixel values without having to store pixel values that have been calculated in a memory.

The first characteristic value determined by the characteristic value determiner 1510 may be a value related to average brightness of the first region forming the first image.

For example, a pixel value of a certain pixel may denote brightness information of the certain pixel. Also, since the first characteristic value is calculated by using brightness information, the first characteristic value may denote a value related to brightness of the first region.

Furthermore, the first characteristic value may be determined by the characteristic value determiner 1510 after the characteristic value determiner 1510 calculates all of the pixel values of the pixels included in the first region.

The device 110 may store, in the register 1540, the first characteristic value determined after all of the pixel values of the pixels included in the first region are calculated.

The characteristic value determiner 1510 may determine a plurality of first characteristic values corresponding to the plurality of regions forming the first image. Also, the characteristic value determiner 1510 may store the determined plurality of first characteristic values in the register 1540.

The number of first characteristic values corresponding to one region forming the first image may be one.

The plurality of regions forming the first image may be set to fill the first image without a gap while not overlapping each other. For example, the plurality of regions may have rectangular shapes having the same size. The characteristic value determiner 1510 may set the plurality of regions by dividing the first image into M×N rectangles or squares.

The illumination image obtainer 1520 may obtain an illumination image related to a second image that is a following image of the first image, based on the first characteristic values determined by the characteristic value determiner 1510.

An illumination image may denote an image related to brightness obtained by using first characteristic values. An illumination image may be related to brightness according to regions of an image obtained by using first characteristic values. The illumination image obtainer 1520 may calculate pixel values of pixels forming the illumination image.

In order to obtain the illumination image, the illumination image obtainer 1520 may use the first characteristic values determined by the characteristic value determiner 1510. For example, in order to determine a pixel value of a first illumination pixel that is an arbitrary illumination pixel forming the illumination image, the illumination image obtainer 1520 may obtain the pixel value of the first illumination pixel by using first characteristic values of regions most adjacent to the first illumination pixel, from among the first characteristic values determined by the characteristic value determiner 1510.

Alternatively, in order to determine the pixel value of the first illumination pixel, the illumination image obtainer 1520 may obtain the pixel value of the first illumination pixel by performing linear interpolation on the first characteristic values based on first characteristic values of four regions most adjacent to the first illumination pixel form among the first characteristic values determined by the characteristic value determiner 1510, and intervals between the first illumination pixel and the four regions most adjacent to the first illumination pixel.

The linear interpolation may be performed by using a related art linear interpolation method. An illumination pixel value may be obtained by using first characteristic values of regions adjacent to the illumination pixel value via not only linear interpolation, but also any related art interpolation method.

The illumination image obtainer 1520 may obtain an image that is more smoothed than an image obtained by only using characteristic values obtained by the characteristic value determiner 1510. Such an image has been described above in detail with reference to FIG. 12.

The illumination image obtainer 1520 may obtain an illumination image by using a previous frame image. The illumination image obtainer 1520 may predict an illumination image of a current frame image by using a previous frame image.

The image modifier 1530 may modify the second image by using the illumination image obtained by the illumination image obtainer 1520.

The first image may be a previous frame image and the second image may be a current frame image.

For example, the image modifier 1530 may modify the second image that is a current frame image by using the illumination image obtained from the first image that is a previous frame image.

Alternatively, the image modifier 1530 may modify pixel values of pixels forming the second image by using differences between pixel values of pixels forming the illumination image and the pixel values of the pixels forming the second image.

The second image modified by the image modifier 1530 may be clearer than the second image before being modified. For example, brightness of the second image modified by the image modifier 1530 may be adjusted according to regions compared to the second image before being modified. When the brightness is adjusted according to regions, objects in the second image modified by the image modifier 1530 may be clearer than those in the second image before being modified. The image modifier 1530 may adjust the brightness according to regions so as to obtain an image that is adaptively clarified according to characteristic values.

The register 1540 may store characteristic values determined by the device 110.

The register 1540 may be a type of temporary storage space of data disposed in the device 110.

Figure 16:
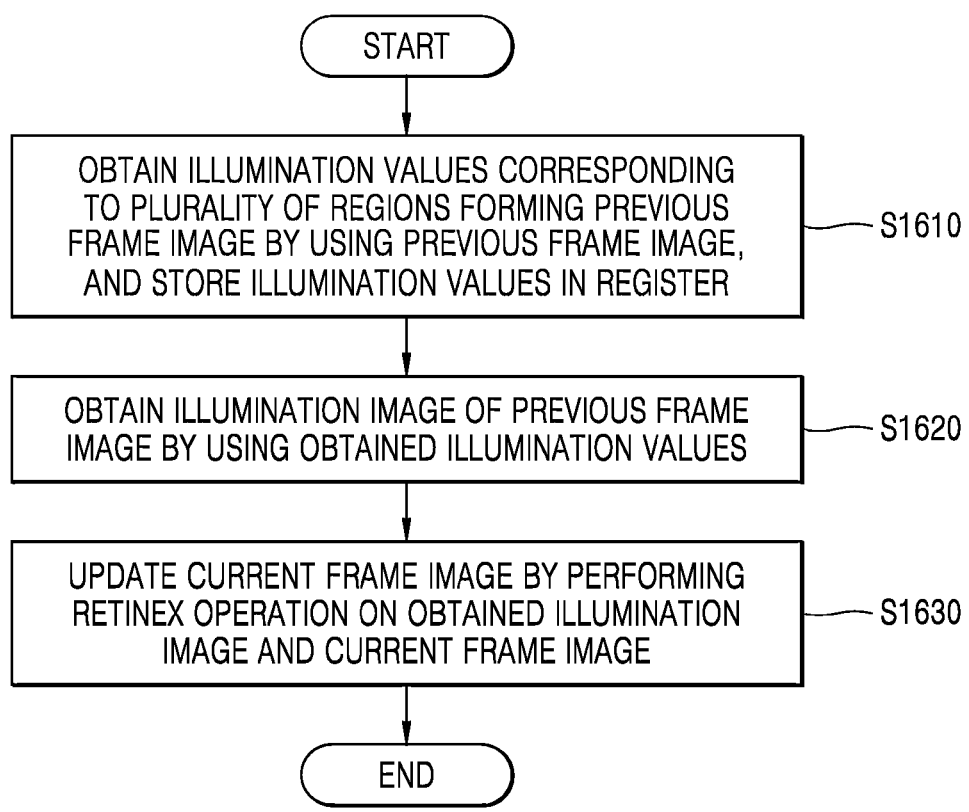
FIG. 16 is a flowchart of a method of updating, by a device, a current frame image, according to one or more exemplary embodiments.

FIG. 16 is a flowchart of a method of updating, by the device 110, a current frame image, according to one or more exemplary embodiments.

Referring to FIG. 16, in operation S1610, the device 110 may obtain illumination values corresponding to a plurality of regions forming a previous frame image, by using the previous frame image, and store the illumination values in the register 1540.

Operation S1610 may be performed in the same manner as operation S210 (FIG. 2) described above.

The device 110 may divide the previous frame image into the plurality of regions. Also, the device 110 may obtain the illumination values of the plurality of regions forming the previous frame image. The illumination value of the previous frame image may denote the first characteristic value described above with reference to FIG. 2. The device 110 may store the obtained illumination values in the register 1540.

In operation S1620, the device 110 may obtain an illumination image of the previous frame image by using the illumination values obtained in operation S1610.

Operation S1620 may be performed in the same manner as operation S220 (FIG. 2) described above.

An illumination image may be related to regional brightness of an image obtained by using first characteristic values.

The device 110 may obtain the illumination image of the previous frame image by performing interpolation on the illumination values obtained in operation S1610.

In operation S1630, the device 110 may update a current frame image by performing a retinex operation on the illumination image obtained in operation S1620 and the current frame image.

Operation S1630 may be performed in the same manner as operation S230 (FIG. 2) described above.

The device 110 may update the current frame image by using the illumination image obtained in operation S1620 and the current frame image. The device 110 may perform the retinex operation while updating the current frame image by using the illumination image obtained in operation S1620 and the current frame image. The device 110 may use any related art method related to the retinex operation.

FIG. 17 is a flowchart of a method of updating, by the device 100, a current frame image by reflecting a scene change, according to one or more exemplary embodiments.

Since operations S1710 and S1720 respectively correspond to operations S1610 and S1620 (FIG. 16), redundant details thereof are not provided again.

Referring to FIG. 17, in operation S1730, the device 110 may determine whether there is a scene change by using the previous frame image and the current frame image.

Operation S1730 may be performed in the same manner as operations S410 and S420 (FIG. 4) described above.

The device 110 may compare the previous frame image and the current frame image to determine whether there is a drastic scene change. While determining whether there is a drastic scene change by comparing the previous frame image and the current frame image, the device 110 may use an illumination value of the previous frame image and an illumination value of the current frame image. Alternatively, while determining whether there is a drastic scene change by comparing the previous frame image and the current frame image, the device 110 may use an illumination value of the previous frame image and a cumulative illumination value in the current frame image.

When it is determined that there is a scene change in operation S1730, the device 110 reflects the scene change and updates the current frame image by performing a retinex operation on the obtained illumination image and the current frame image, in operation S1740.

Operation S1740 may be performed in the same manner as operation S430 (FIG. 4) described above.

When it is determined that there is a scene change in operation S1730, the device 110 may obtain an illumination image in which the scene change is reflected. Then, the device 110 may update the current frame image by using the current frame image and the illumination image in which the scene change is reflected. While updating the current frame image, the device 110 may use the retinex operation. The device 110 may use any related art method related to the retinex operation.

It is understood that in the above description, when a part "includes" or "comprises" an element, unless there is a particular description contrary thereto, the part can further include other elements, not excluding the other elements.

One or more exemplary embodiments can be written as computer programs and can be implemented in general-use digital computers programmed as special purpose computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc. Additionally, it is understood that any of the above components or units may be implemented as hardware and/or software, e.g., may be implemented as circuitry, memory, at least one processor, etc.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A method of processing image data, the method comprising:
   determining first characteristic values, without storing pixel values of pixels, respectively of a plurality of regions of a first image by sequentially calculating, for each of the plurality of regions, characteristic values corresponding to each of the pixel values of the pixels included in each of the plurality of regions while sequentially receiving the pixel values of the pixels;
   obtaining, based on the determined first characteristic values, an illumination image related to a second image that is a following image of the first image; and
   modifying, based on the obtained illumination image, the second image,
   wherein the modifying comprises:
   determining whether at least a predetermined proportion of the pixel values of the pixels included in each of the plurality of regions of the first image are within a predetermined range; and
   determining whether to modify the second image based on a result of the determining whether the at least the predetermined proportion of the pixel values are within the predetermined range.

2. The method of claim 1, wherein the determining the first characteristic values comprises:
   obtaining a first pixel value of a first pixel included in a first region from among the plurality of regions of the first image while sequentially receiving pixel values of pixels included in the first region;
   obtaining a second pixel value of a second pixel included in the first region while sequentially receiving the pixel values of the pixels included in the first region;
   determining a cumulative characteristic value based on a weighted sum of the first pixel value and the second pixel value;
   obtaining a third pixel value of a third pixel included in the first region while sequentially receiving the pixel values of the pixels included in the first region; and
   updating the cumulative characteristic value based on a weighed sum of the cumulative characteristic value and the third pixel value.

3. The method of claim 1, wherein the obtaining the illumination image comprises obtaining a pixel value of an illumination pixel included in the illumination image based on first characteristic values, among the determined first characteristic values, of a predetermined number of regions, which are most adjacent to the illumination pixel, from among the plurality of regions.

4. The method of claim 3, wherein the obtaining the illumination image further comprises performing linear interpolation on intervals between the illumination pixel and the predetermined number of regions.

5. The method of claim 1, further comprising:
   determining second characteristic values respectively of a plurality of regions of a second image by sequentially calculating, for each of the plurality of regions, characteristic values of each of pixel values of pixels included in each of the plurality of regions while sequentially receiving the pixel values of the pixels; and
   determining third characteristic values respectively of corresponding regions, from among the plurality of regions of the first image and the plurality of regions of the second image, based respectively on the first characteristic values and the second characteristic values of the corresponding regions,
   wherein the obtaining the illumination image is performed based on the third characteristic values determined based on the first characteristic values.

6. The method of claim 5, wherein the modifying comprises:
   determining reflectance pixel values based on the third characteristic values and the pixel values of the pixels included in each of the plurality of regions of the second image;
   determining output pixel values based on a weighted sum of the third characteristic values and the reflectance pixel values; and
   modifying the second image based on the determined output pixel values.

7. The method of claim 1, further comprising storing the determined first characteristic values in a register.

8. The method of claim 1, wherein the determining whether to modify the second image comprises skipping the modifying of the second image in response to determining that the at least the predetermined proportion of the pixel values are within the predetermined range.

9. The method of claim 1, wherein the first image is an image of a previous frame and the second image is an image of a current frame.

10. A device for processing image data, the device comprising:
    a processor configured to sequentially receive pixel values of pixels, determine first characteristic values, without storing the pixel values, respectively of a plurality of regions of a first image by sequentially calculating, for each of the plurality of regions, characteristic values of each of the pixel values of the pixels included in each of the plurality of regions while sequentially receiving the pixel values of the pixels included, obtain, based on the determined first characteristic values, an illumination image related to the first image, modify, based on the obtained illumination image, a second image that is a following image of the first image, determine whether at least a predetermined proportion of the pixel values of the pixels included in each of the plurality of regions of the first image are within a predetermined range, and determine whether to modify the second image based on a result of the determining whether the at least the predetermined proportion of the pixel values are within the predetermined range; and
    a display configured to display the modified second image.

11. The device of claim 10, wherein the processor is further configured to:

obtain a first pixel value of a first pixel included in a first region from among the plurality of regions of the first image while sequentially receiving pixel values of pixels included in the first region;

obtain a second pixel value of a second pixel included in the first region while sequentially receiving the pixel values of the pixels included in the first region; and determine a characteristic value of the first region based on the first pixel value and the second pixel value.

12. The device of claim 11, wherein the processor is further configured to obtain a pixel value of an illumination pixel included in the illumination image based on first characteristic values, among the determined first characteristic values, of a predetermined number of regions, which are most adjacent to the illumination pixel, from among the plurality of regions.

13. The device claim 10, wherein:

the processor is further configured to determine second characteristic values respectively of a plurality of regions of a second image by sequentially calculating, for each of the plurality of regions, characteristic values corresponding to each of pixel values of pixels included in each of the plurality of regions while sequentially receiving the pixel values of the pixels, and to determine third characteristic values respectively of corresponding regions, from among the plurality of regions of the first image and the plurality of regions of the second image, based respectively on the first characteristic values and the second characteristic values of the corresponding regions; and the processor is further configured to obtain the illumination image based on the third characteristic values determined based on the first characteristic values.

14. The device of claim 13, wherein the processor is further configured to:

determine reflectance pixel values based on the third characteristic values and the pixel values of the pixels included in each of the plurality of regions of the second image;

determine output pixel values based on a weighted sum of the third characteristic values and the reflectance pixel values; and modify the second image based on the determined output pixel values.

15. The device of claim 10, further comprising a register configured to store the determined first characteristic values.

16. A method of processing image data, the method comprising:

obtaining illumination values, without storing pixel values of pixels included in previous frame image, respectively corresponding to each of a plurality of regions of the previous frame image based on the previous frame image, and storing the obtained illumination values in a register;

obtaining an illumination image of the previous frame image based on the obtained illumination values; and updating a current frame image by performing a retinex operation on the obtained illumination image and the current frame image wherein the updating comprises:

determining whether at least a predetermined proportion of the illumination values of the pixels included in each of the plurality of regions of the previous frame image are within a predetermined range; and determining whether to update the current frame image based on a result of the determining whether the at least the predetermined proportion of the illumination values are within the predetermined range.

17. The method of claim 16, further comprising:

determining whether a scene change occurs from the previous frame image to the current frame image, based on the previous frame image and the current frame image, wherein the updating the current frame image is performed by reflecting the scene change in the current frame image in response to determining that the scene change occurs.

18. A non-transitory computer-readable recording medium having recorded thereon a program, which when executed by a computer, performs the method of claim 1.

* * * * *